(12) United States Patent
Tian et al.

(10) Patent No.: US 12,470,445 B2
(45) Date of Patent: Nov. 11, 2025

(54) MULTI-CARRIER ON-OFF KEYING COMMUNICATIONS

(71) Applicant: QUALCOMM Incorporated, San Diego, CA (US)

(72) Inventors: Qingjiang Tian, San Diego, CA (US); Jing Sun, San Diego, CA (US); Piyush Gupta, Bridgewater, NJ (US); Zhifei Fan, San Diego, CA (US); Raviteja Patchava, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 18/494,901

(22) Filed: Oct. 26, 2023

(65) Prior Publication Data

US 2025/0141723 A1    May 1, 2025

(51) Int. Cl.
H04L 27/06    (2006.01)
H04L 27/04    (2006.01)

(52) U.S. Cl.
CPC ............ *H04L 27/066* (2013.01); *H04L 27/04* (2013.01)

(58) Field of Classification Search
CPC .............................. H04L 27/066; H04L 27/04
USPC .......... 375/262, 340–341, 346, 348
See application file for complete search history.

(56) References Cited

U.S. PATENT DOCUMENTS

| | | | |
|---|---|---|---|
| 6,522,637 B1 | 2/2003 | Mimura et al. | |
| 7,187,871 B1 * | 3/2007 | Kaushik | H04B 10/676 |
| | | | 398/183 |
| 10,951,344 B2 | 3/2021 | Matsuda et al. | |
| 2005/0018762 A1 * | 1/2005 | Aiello | H04L 1/0003 |
| | | | 375/219 |
| 2006/0044854 A1 * | 3/2006 | Bocchiola | H02M 1/4208 |
| | | | 363/86 |
| 2008/0056419 A1 | 3/2008 | Lee et al. | |
| 2009/0111390 A1 * | 4/2009 | Sutton | H04B 1/24 |
| | | | 455/193.1 |

(Continued)

FOREIGN PATENT DOCUMENTS

| | | |
|---|---|---|
| EP | 1542418 A1 | 6/2005 |
| KR | 101060303 B1 | 8/2011 |

(Continued)

OTHER PUBLICATIONS

3GPP: "3rd Generation Partnership Project, Technical Specification Group Radio Access Network, NR, Physical Channels and Modulation (Release 18)", 3GPP TS 38.211, V18.0.0, Sep. 2023, pp. 1-159.

(Continued)

*Primary Examiner* — Emmanuel Bayard
(74) *Attorney, Agent, or Firm* — Dinsmore & Shohl LLP

(57) ABSTRACT

Certain aspects of the present disclosure provide techniques for multi-carrier on-off keying communications. A method for wireless communications by an apparatus includes receiving a signal comprising multiple carrier frequencies modulated with on-off keying; decoding the signal based at least in part on a delta frequency being associated with a first carrier frequency and a second carrier frequency among the multiple carrier frequencies; and recovering data from the decoded signal.

30 Claims, 14 Drawing Sheets

(56) References Cited

U.S. PATENT DOCUMENTS

| | | | | |
|---|---|---|---|---|
| 2013/0143501 A1* | 6/2013 | Huang | ................ | H04B 1/0475 |
| | | | | 455/205 |
| 2016/0205695 A1* | 7/2016 | Kishiyama | .......... | H04W 52/243 |
| | | | | 370/315 |
| 2018/0274122 A1* | 9/2018 | Guskov | ................ | H02M 3/335 |
| 2020/0204292 A1* | 6/2020 | Jiang | .................... | H04L 1/0038 |
| 2022/0115941 A1* | 4/2022 | May | .................... | H03K 17/689 |
| 2024/0089018 A1* | 3/2024 | Shrivastava | ......... | H04B 17/318 |
| 2024/0146408 A1* | 5/2024 | Herath | ................ | H04J 13/004 |

FOREIGN PATENT DOCUMENTS

| | | | |
|---|---|---|---|
| WO | 2018141254 A1 | 8/2018 | |
| WO | 2023185489 A1 | 10/2023 | |

OTHER PUBLICATIONS

International Search Report and Written Opinion—PCT/US2024/049773—ISA/EPO—Dec. 11, 2024.

Yang S (LG Electronics)., et al., "Discussion on L1 Signal Design and Procedure for LP-WUS", 3GPP TSG RAN WG1 #114, R1-2307795, 3rd Generation Partnership Project, Mobile Competence Centre, 650, Route Des Lucioles, F-06921 Sophia-Antipolis Cedex, France, vol. RAN WG1, No. Toulouse, FR, Aug. 21, 2023-Aug. 25, 2023, Aug. 11, 2023, 13 Pages, XP052437015, section 2.6.

Co-pending U.S. Appl. No. 18/314,399, inventor Patchava; Raviteja, filed May 9, 2023.

\* cited by examiner

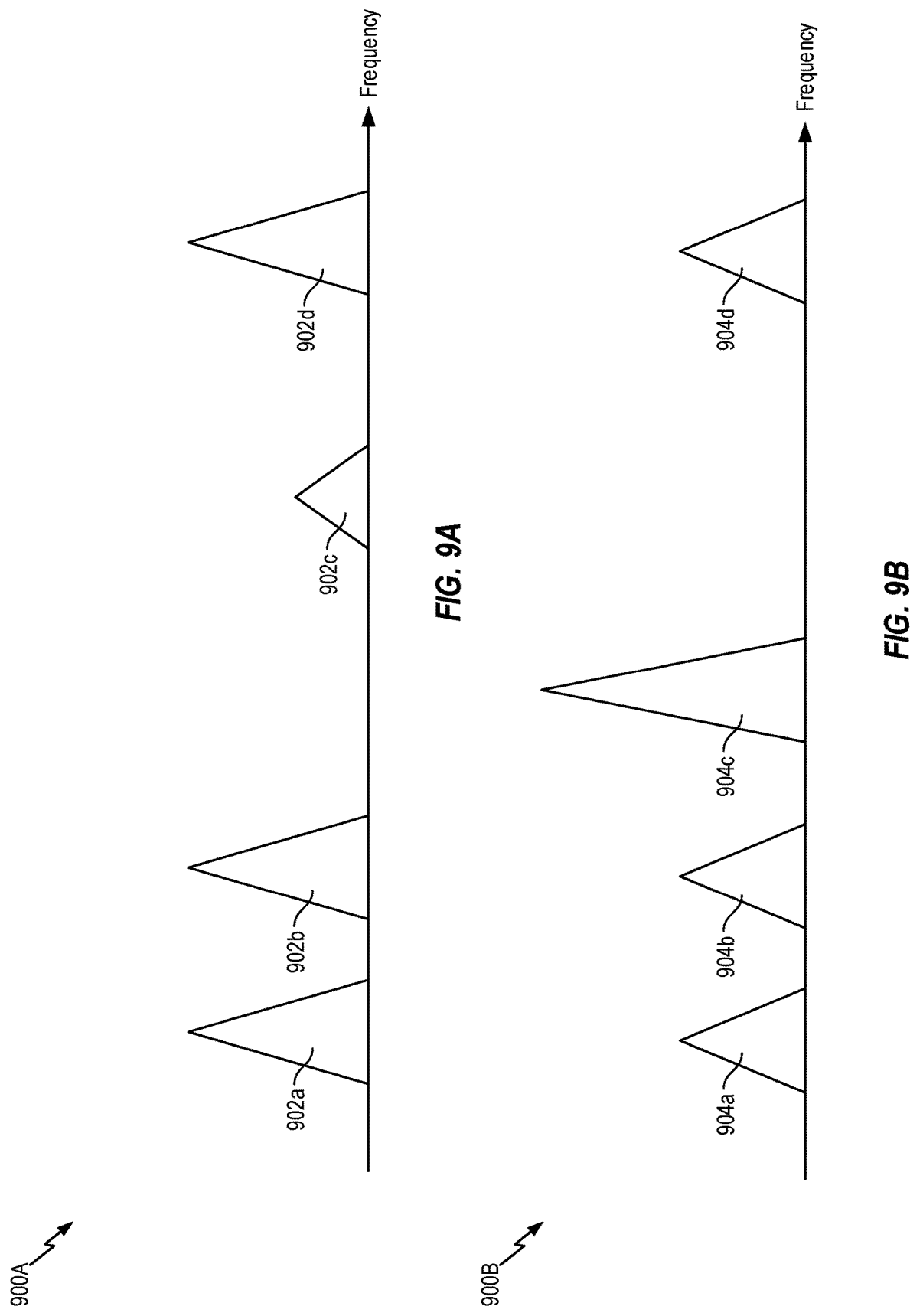

MULTI-CARRIER ON-OFF KEYING COMMUNICATIONS

INTRODUCTION

Field of the Disclosure

Aspects of the present disclosure relate to wireless communications, and more particularly, to techniques for multi-carrier on-off keying (OOK) communications.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes receiving a signal comprising multiple carrier frequencies modulated with on-off keying; decoding the signal based at least in part on a delta frequency being associated with a first carrier frequency and a second carrier frequency among the multiple carrier frequencies; and recovering data from the decoded signal.

Another aspect provides a method for wireless communications by an apparatus. The method includes obtaining an indication of one or more delta frequencies for decoding a multi-carrier signal modulated with on-off keying, the one or more delta frequencies including a delta frequency; and sending a signal comprising multiple carrier frequencies modulated with the on-off keying, wherein the multiple carrier frequencies comprise a first carrier frequency and a second carrier frequency, wherein the delta frequency is associated with the first carrier frequency and the second carrier frequency, and wherein the signal comprises data.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 9A and 9B depict example spectral densities of delta frequency components associated with a multi-carrier OOK signal under different channel conditions.

DETAILED DESCRIPTION

Figure 1:
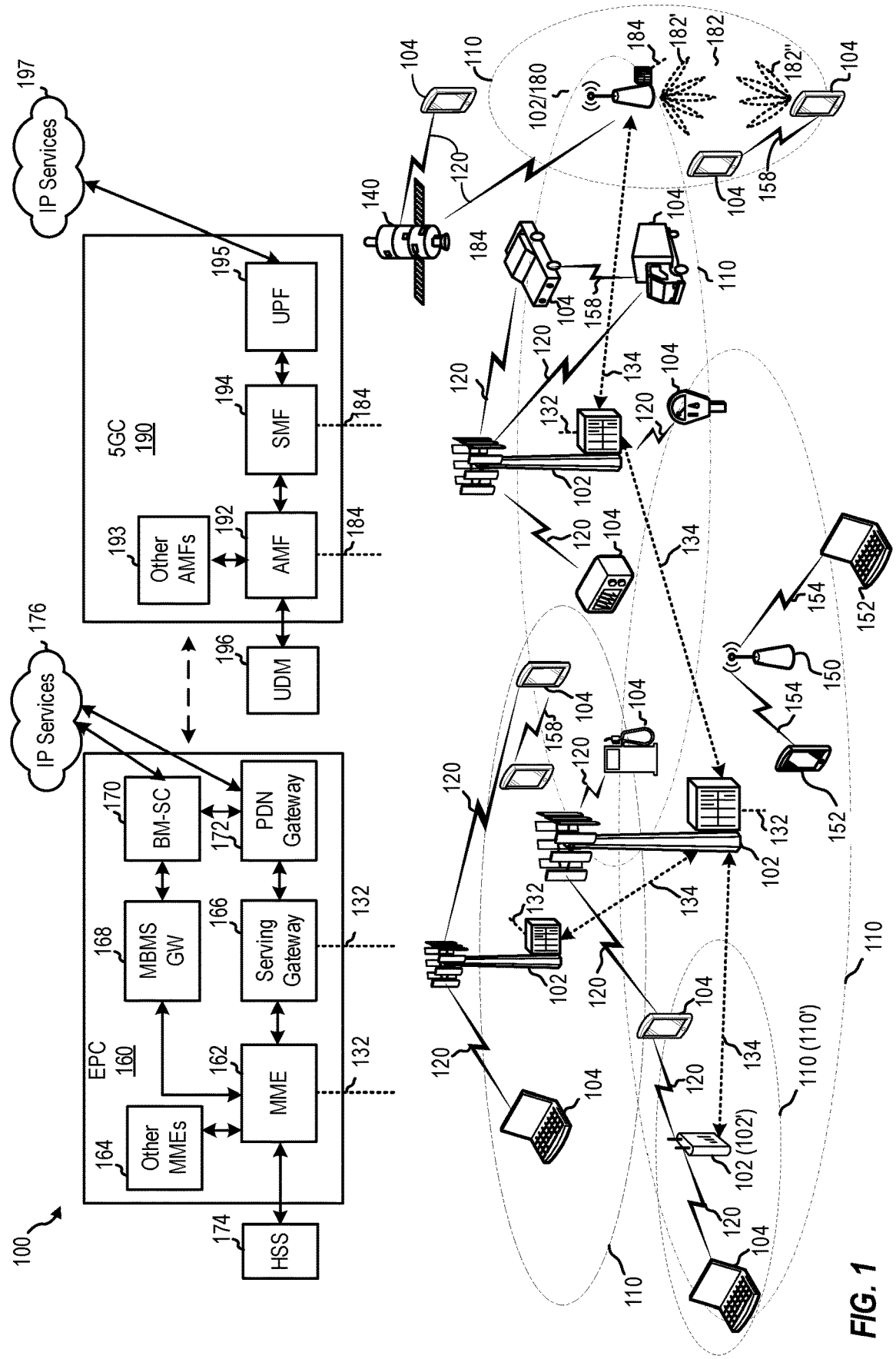
FIG. 1 depicts an example wireless communications network.

Aspects of the present disclosure provide apparatuses, methods, processing systems, and computer-readable mediums for multi-carrier on-off keying communications.

Certain wireless communication systems (e.g., an Evolved Universal Terrestrial Radio Access (E-UTRA) system, 5G New Radio system, and/or any future wireless communication system) may enable access to network services using a physical layer configured for very low power consumption and low complexity, which may be beneficial for devices operating on battery power (e.g., Internet-of-Things (IoT) devices) and/or utilizing power harvesting circuitry. Some IoT devices may include ambient IoT devices (e.g., UEs), such as active IoT devices, semi-passive IoT devices, and passive IoT devices, as further described herein.

Technical problems for wireless communications for IoT devices include, for example, energy management (e.g., reducing energy consumption for low powered sensors) and device complexity (e.g., reducing transceiver complexity for low cost devices). Certain modulation schemes (e.g., quadrature phase shift keying (QPSK) and/or quadrature amplitude modulation (QAM)) may not account for the energy consumption and/or transceiver complexity used to perform such modulation schemes. Such modulation schemes may use transceivers that consume too much power for an IoT device, especially an ambient IoT. In addition, the modulation schemes may use a relatively complex transceiver that can make an IoT device too costly for various use cases, for example, as a sensor, identification tag, etc.

In some cases, the IoT physical layer may enable low power consumption and/or low complexity via the use of a simple modulation waveform, such as On-Off Keying (OOK) modulation. OOK modulation may be used for downlink (and/or sidelink) transmission for certain IoT devices (e.g., passive or semi-passive IoT identification tags referred to herein as a tag), for example. OOK detection may not use down-conversion of the radio frequency signal and frequency synchronization, which can translate into a reduction of complexity for a receive chain of the IoT device. For example, at the IoT device, an envelope tracking (ET) based decoding architecture may be used. The ET architecture may recover an amplitude modulation signal corresponding to an amplitude envelope of the OOK.

Technical problems for OOK modulation include, for example, interference rejection and/or signal fading. For example, ET waveforms (e.g., an OOK signal) may be subject to interference from other wireless communication devices, especially when a single carrier OOK signal is in the interference bandwidth. Transmissions from other wireless communication devices may have a similar amplitude envelope as the envelope used for OOK modulation, and these transmissions from other wireless communication devices may cause interference at an IoT device. This interference may disrupt the envelope tracking operations at the IoT device, resulting in degraded received signal quality and/or signal strength. In certain cases, the OOK signal may undergo frequency selective fading, and it may be possible for the OOK signal to be completely faded. In some cases, a power spectral density (PSD) specification may set a specific PSD per megahertz of frequency bandwidth in the channel. Even with high processing gain, a high signal-to-interference plus noise ratio (SINR) may be used to recover the OOK signal with ET. However, such a high SINR may not be feasible due to interference, fading, and/or the PSD specification. These technical problems may lead to wireless communication performance for OOK communications that does not meet certain specifications (e.g., throughput, latency, and/or reliability) as expected by various generations of wireless technologies.

Aspects described herein overcome the aforementioned technical problem(s) by providing techniques for communicating with a multi-carrier OOK signal. To improve the signal quality and/or signal strength of a signal received at a receiving device (e.g., an IoT device), the same OOK signal may be modulated on multiple carriers. The multi-carrier OOK signal may allow for frequency diversity to avoid and/or mitigation against interference from other wireless communication devices (and/or avoid/mitigate other effects of signal propagation) as further described herein.

Figure 7:
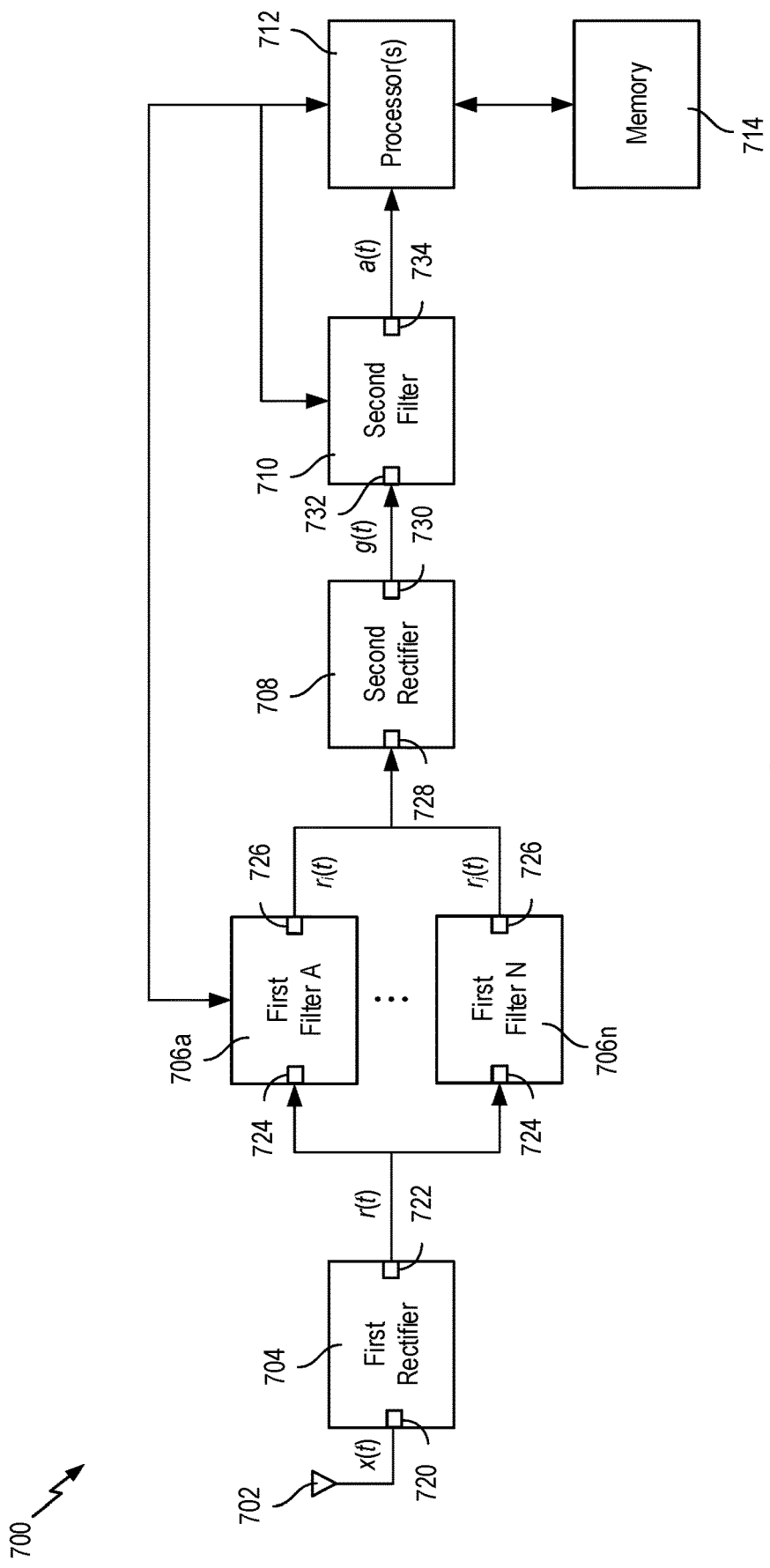
FIG. 7 depicts an example receiver architecture for multi-carrier on-off keying (OOK) signal demodulation.

At the receiving device, the multi-carrier OOK signal may be demodulated using a specialized receiver architecture referred to herein as a two-stage rectifier architecture, for example, as further described with respect to FIG. 7. In general, the initial rectifier in the receiver architecture may generate a product of two-carrier pairs among the multiple carriers in the multi-carrier OOK signal. The product of carrier pairs may be modeled as a sinusoidal signal at a delta frequency of the two carriers. If the carrier frequencies are $f_0$ and $f_1$, respectively, a peak associated with the amplitude modulation (e.g., OOK modulation) may be recovered at the delta frequency $(f_1-f_0)$. For example, with the delta frequency in the pass band of a filter, a direct current (DC) component, which is indicative of the information payload of the received signal, may be recovered at the receiving device. The receiving device may use any of the delta frequencies associated with the multi-carrier OOK signal for demodulation as further described herein.

The techniques for multi-carrier OOK communications as described herein may provide any of various beneficial effects and/or advantages. The techniques for multi-carrier OOK communications may enable improved wireless communication performance, such as reduced power consumption, reduced complexity, increased data rates, reduced latency, increased reliability, etc. The improved wireless communication performance may be attributable to the multi-carrier OOK communications described herein, for example, due to the interference mitigation (and/or mitigation of the other signal propagation effects) facilitated by the delta frequency decoding. For example, decoding at a delta frequency may avoid and/or mitigate against interference in the ET window. In some cases, due to the multiple carriers being modulated with the same OOK signal, the delta frequency may provide a stronger signal quality and/or signal strength received signal compared to a single carrier OOK signal. In addition, the receiver architecture described herein avoids the use of costly and energy hungry transceiver components, such as amplifier(s) for signal amplification, frequency synthesizer(s) and mixer(s) for down conversion, and/or an analog-to-digital converter (ADC) for data recovery. As an example, the receiver architecture described herein is capable of down conversion to a delta frequency using a rectifier as further described herein. Moreover, as the recovered DC component of the recovered OOK signal is effectively a digital signal, the receiver architecture is capable of analog-to-digital signal conversion without an ADC.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140 or other aerial platforms, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
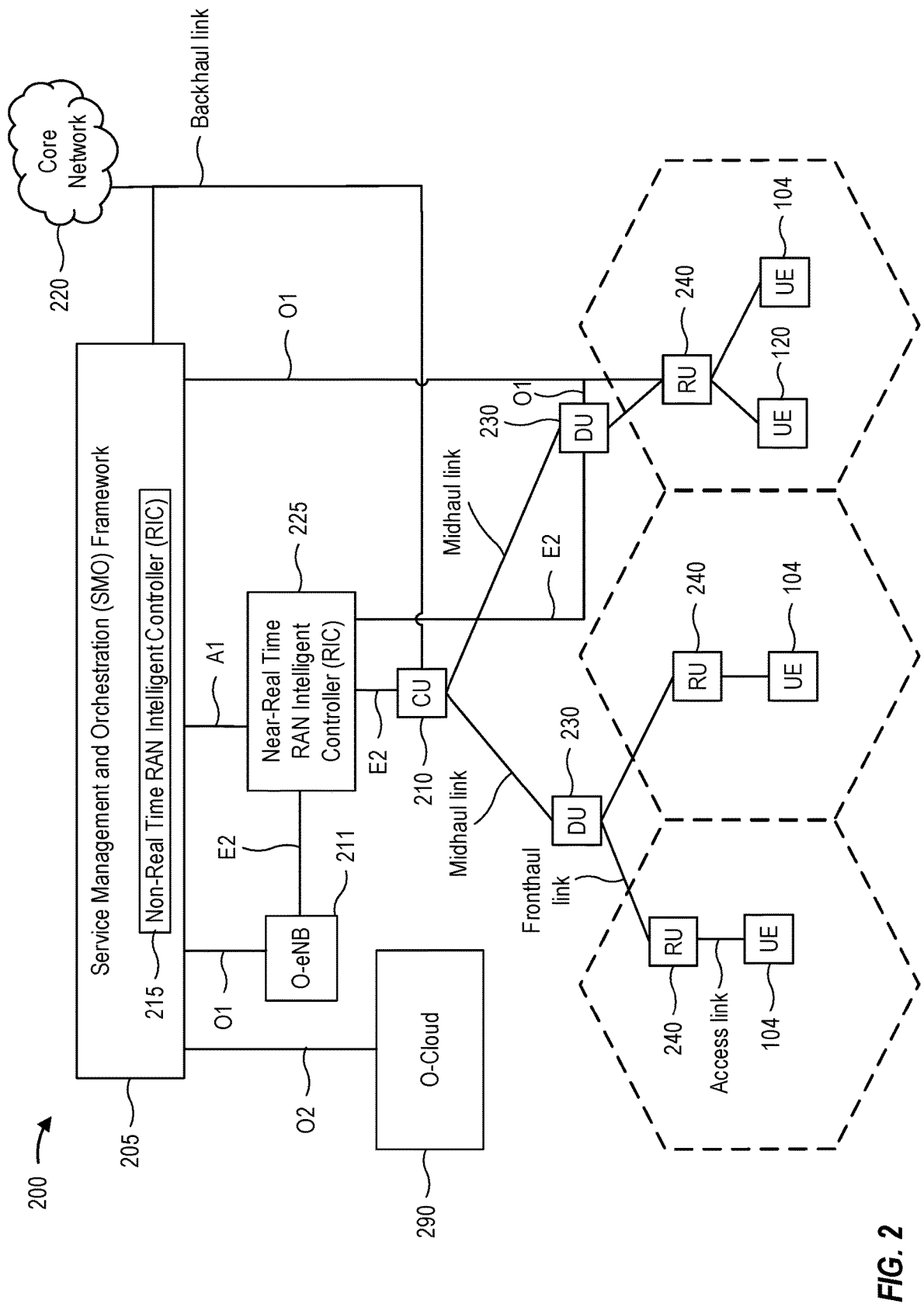
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
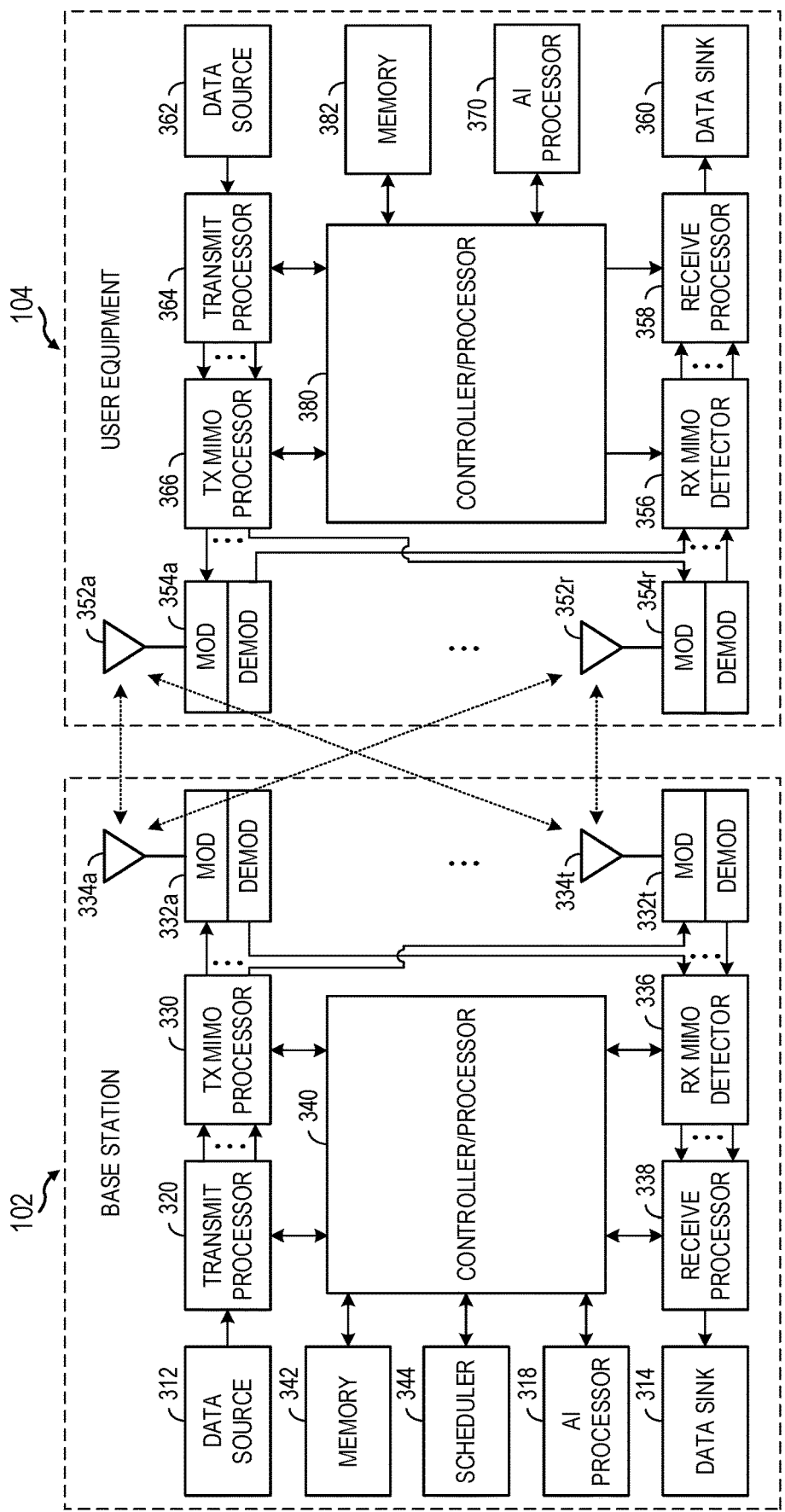
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, 370, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., global navigation satellite system (GNSS) positioning). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
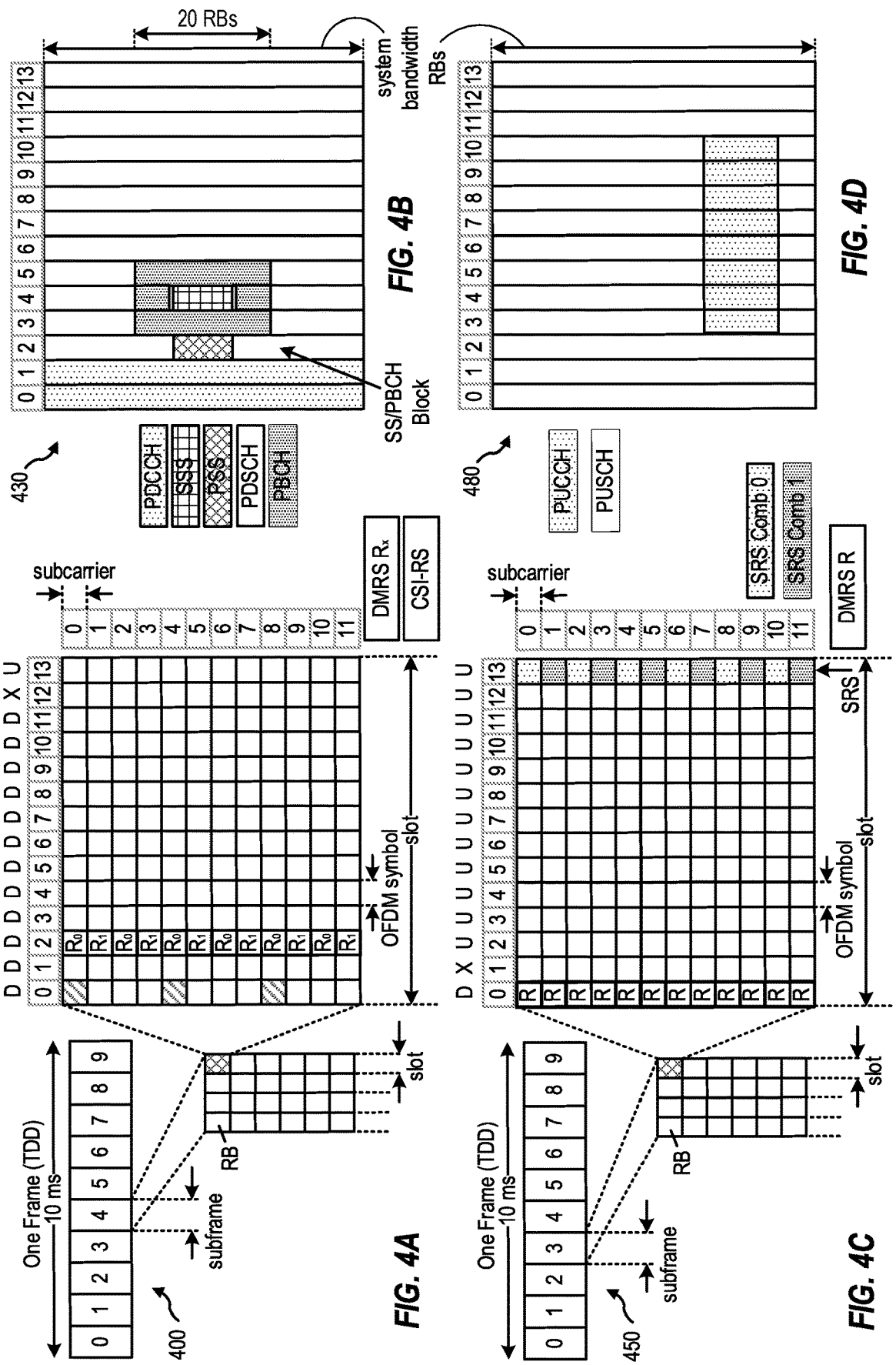
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology u, there are $2^u$ slots per subframe. Thus, numerologies (u) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^\mu \times 15$ kHz, where u is the numerology 0 to 6. As an example, the numerology u=0 corresponds to a subcarrier spacing of 15 kHz, and the numerology u=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology u=2 with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Low-Power UE with Energy Harvesting

Generally, ambient IoT devices may include several device subclasses, including active IoT devices, semi-passive IoT devices, and passive-IoT devices. Ambient IoT devices are generally capable of operating based on energy harvested from the ambient environment, such as from received radio frequency (RF) energy, solar energy, vibrational energy, and others.

An active IoT device is generally capable of harvesting ambient energy as well as using energy stored onboard the device, such as in a battery or capacitor. An active IoT device generally includes both active radio equipment (e.g., an active radio) and passive radio equipment (e.g., a backscatter-type radio). A backscatter-type radio uses existing radio frequency signals to transmit data by modifying and reflecting received signals with encoded data. Capabilities of an active IoT device may thus be similar to other types of UEs with the addition of energy harvesting capabilities.

A semi-active IoT device is generally capable of harvesting ambient energy as well as using energy stored onboard the device, and likewise generally includes both active radio equipment and passive radio equipment, like a backscatter-type radio. In some cases, semi-active IoT devices may be capable of synchronous (e.g., course synchronous) and asynchronous communication. In some cases, semi-active IoT devices may omit a power amplifier and/or a low-noise amplifier. Further, semi-active IoT devices may generally use a reduced protocol stack (e.g., compared to an active IoT device). These aspects of semi-active IoT device generally help to balance power consumption, functionality, and cost. So-called "ultra-light IoT" devices are one type of semi-active IoT device.

A passive IoT device is generally capable of operating based on energy harvested from the environment using passive radio equipment (e.g., a backscatter-type radio). Passive IoT UEs are generally capable of asynchronous communication and may not have a power amplifier or a low-noise amplifier. Passive IoT UEs may generally use a reduced protocol stack (e.g., compared to an active IoT).

Figure 5:
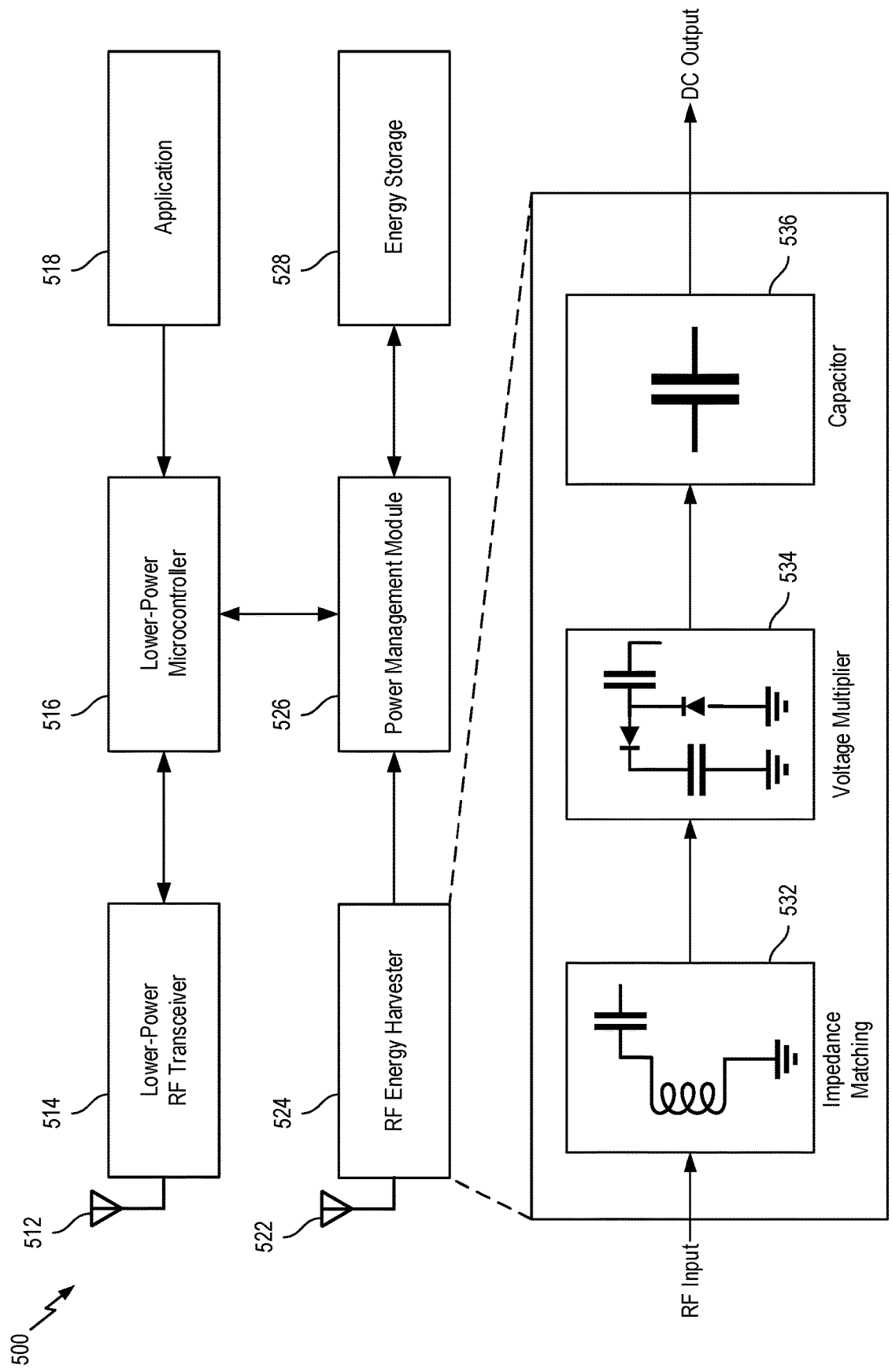
FIG. 5 depicts example components of an energy harvesting-capable UE.

FIG. 5 depicts example components 500 of an energy harvesting-capable UE. Various example components 500 may be incorporated into ambient IoT devices.

In this example, components 512-518 are aspects of a data transmission pipeline. In particular, antenna 512 and RF transceiver 514 (e.g., a low power RF transceiver) may transmit and/or receive data. Microcontroller 516 (e.g., a low power microcontroller) may process data received from an application 518.

Further in this example, components 522-528 are aspects of an RF-energy-harvesting pipeline. In particular, antenna 522 and an RF energy harvester 524 are configured to harvest RF energy. In some aspects, RF energy harvester 524 includes an impedance matching circuit 532, a voltage multiplier 534, and a capacitor 536 to collect RF signals and convert them into electricity. In some aspects, a power management module 526 determines whether to store the electricity obtained from the RF energy harvester 524 or to use the electricity for information transmission immediately. In this example, energy storage 528 (e.g., a battery or a capacitor) is configured to store energy converted by the RF energy harvester 524.

As above, in various aspects, an ambient IoT UE may include the components depicted and described with respect to FIG. 5. In some aspects, a passive IoT UE may omit certain aspects depicted and described with respect to FIG. 5, such as energy storage 528. Further, while multiple antennas (512 and 522) are depicted in this example, in others, a single antenna and antenna switching component may be used to share the antenna between transceiver 514 and RF energy harvester 524, such as described further with respect to FIG. 6.

Figure 6:
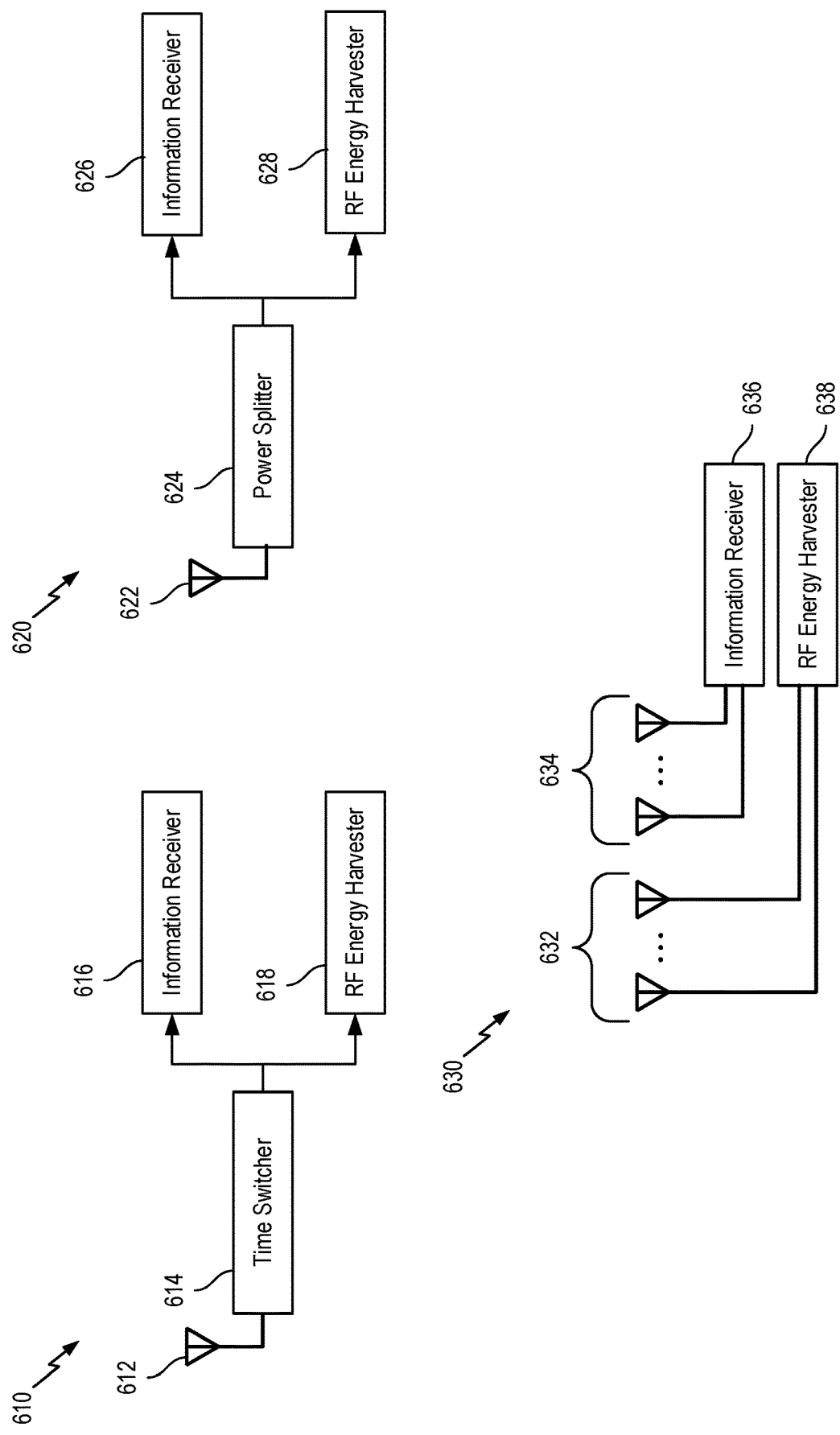
FIG. 6 depicts aspects relating to different radio frequency energy harvesting and RF communication architectures for an energy harvesting-capable device.

FIG. 6 depicts aspects 610, 620, and 630 relating to different RF energy harvesting and RF communication architectures for an energy harvesting-capable device, such as an ambient IoT UE.

In particular, aspect 610 depicts antenna 612 connected to time switcher 614. In some aspects, time switcher 614 is configured to allow an energy harvesting-capable UE to switch between (1) being connected to information receiver 616 and (2) being connected to RF energy harvester 618. For example, the device may exchange wireless communication and RF energy at different, e.g., non-overlapping, times.

Aspect 620 depicts antenna 622 connected to power splitter 624. In some aspects, power splitter 624 is configured to allow an energy harvesting-capable device to distribute power between (1) information receiver 626 and (2) RF energy harvester 628. Thus, in this example, the device may exchange wireless communication and RF energy at overlapping times. For example, a received RF signal may be split into two streams, with one stream for the information receiver 626 and the other stream for the RF energy harvester 628.

Aspect 630 depicts an example separated receiver architecture. In particular, a first set of antennas 632 is connected with an RF energy harvester 638 and a second set of antennas 634 is connected with information receiver 636. FIG. 5, described above, depicts a separated receiver architecture.

RF energy may be harvested from various signal types. For example, RF energy may be harvested via one or more of a deterministic signal (e.g., a pilot signal), a random signal such as a circularly symmetric complex Gaussian random signal, and/or an improper complex Gaussian random signal (e.g., a signal in which real and imaginary components have different variances).

In certain aspects, an IoT device may communicate via OOK modulation in order to facilitate a receive chain that is capable of operating at low powers and/or from harvested power, for example, as described herein with respect to FIGS. 5 and 6.

Aspects Related to Multi-Carrier OOK Communications

Aspects of the present disclosure provide techniques for communicating with a multi-carrier OOK signal. The receiving device may use a two-stage rectifier architecture, for example, as described herein with respect to FIG. 7. The first stage of rectification may track the envelope of the multi-carrier OOK signal, and the second stage of rectification may enhance the amplitude modulation signal and improve the performance of the receiving device. The multi-carrier OOK signal spreads the energy of the signal across multiple carriers to facilitate frequency diversity. Such frequency diversity may enable mitigation of interference and/or selective frequency fading. As an example, if the signal on a carrier is faded due to selective frequency fading and/or attenuated due to interference, the multi-carrier OOK signal has other carrier(s) available for demodulation. The receiver architecture described herein allows the receiving device to process the signal at one or more delta frequencies without knowing the carrier frequencies. This provides the transmitter with some flexibility in choosing the carrier frequencies of the multi-carrier OOK signal, for example, to avoid and/or mitigate against interference or selective frequency fading.

Example Receiver Model for Multi-Carrier OOK Signal

In general, a signal model for an OOK waveform over time may be given by the following expression:

$$x(t) = \sqrt{P}(1 - a(t))\sin(\omega t) \quad (1)$$

where $\omega$ is the carrier frequency (e.g., the center frequency of the carrier), a(t) is the amplitude modulation signal associated with the OOK for encoding the information payload on the carrier signal (e.g., $a(t)=\pm 1$, where $1-a(t)=0$ or 2), and P is average power of the signal (which may be assumed to be the received power, e.g., P=1). The average power for the amplitude modulation signal is 2. Additional pulse shaping/filtering on a(t) may be applied to improve the spectrum.

The output of a rectifier is given by the following expression:

$$r(x) = |x| \quad (2)$$

where x is the input signal (e.g., an OOK waveform).

Using the first term in a Taylor series expansion of a rectifier, the rectifier output may be approximated according to the following expression:

$$r(x) = x^2 \quad (3)$$

A multi-carrier OOK signal allows the transmit energy to be spread across K carriers carrying the same OOK signal, for example, as represented by the following expression:

$$x(t) = \frac{1}{\sqrt{K}}(1 - a(t))(\sin(\omega_0 t) + \sin(\omega_1 t) + \ldots + \sin(\omega_{K-1} t)) \quad (4)$$

where the power is normalized such that each carrier has 1/K of the total power.

For a multi-carrier OOK signal passing through a rectifier approximated as $x^2$, the rectified signal over time may be given by the following expression:

$$r(t) = \left(\frac{1}{\sqrt{K}}(1 - a(t))\sum_k \sin(\omega_k t)\right)^2 = \frac{1}{K}(1 - 2a(t) + a^2(t)) \quad (5)$$

$$\left(\sum_k \sin^2(\omega_k t) + \sum_{k \neq j}\sin(\omega_k t)\sin(\omega_j t)\right)$$

As $a^2(t)=1$ and $$\sin^2(\omega_k t) = \frac{1}{2}(1 - \cos(2\omega_k t)),$$

the $\cos(2\omega_k t)$ terms may be removed using filtering as further described herein. Under an assumption that there is an equal distance between adjacent carrier frequencies in a multi-carrier OOK signal, the product $\sin(\omega_k t)\sin(\omega_j t)$ can be expressed as follows:

$$\sin(\omega_k t)\sin(\omega_{k+i} t) = \sin((\omega_0 + k\Delta\omega)t)\sin((\omega_0 + (k+i)\Delta\omega)t) = \quad (6)$$

$$\frac{1}{2}(\cos(i\Delta\omega t) - \cos((2\omega_0 + (2k+i)\Delta\omega)t))$$

As $(2\omega_0+(2k+i)\Delta\omega)$ is a high frequency component, this component may be removed using filtering as further described herein. Note that similar high frequency components may be removed using filtering when the carrier frequencies are not equally spaced. Hence, the product $\sin(\omega k_t) \sin(\omega_j t)$ may be approximated as a delta frequency component $$\frac{1}{2}\cos(i\Delta\omega t).$$

The rectified signal for a particular delta frequency component may be reduced to the following expression:

$$r_i(t) = \frac{1}{K}(1 - 2a(t) + a^2(t))(K - i)\cos(i\Delta\omega t) = \frac{2(K-i)}{K}(1 - a(t))\cos(i\Delta\omega t) \quad (7)$$

The delta frequency component may be removed via further filtering as further described herein. Hence, the amplitude modulation signal may be recovered from the delta frequency component using the receiver architecture further described herein:

$$r_i(t) = 1 - a(t) \quad (8)$$

As $1-a(t)$ represents the amplitude modulation signal, the receiver architecture described herein may recover the information payload as indicated by the amplitude modulation signal. Such a recovered signal may match the single carrier OOK rectifier output for an additive white Gaussian noise (AWGN) channel. The average energy may be equal to 2, assuming equal probability for a(t) to be $\pm 1$.

Example Receiver Architecture for Multi-Carrier OOK Signal Demodulation

For demodulation, the receiving device may use any of the delta frequencies associated with the multi-carrier OOK signal, such as the lowest delta frequency (e.g., $\Delta\omega=\omega_{k+1}-\omega_k$), a higher delta frequency (e.g., $i\Delta\omega=\omega_{k+i}-\omega_k$), or multiple delta frequencies (e.g., $i\Delta w=\omega_{k+i}-\omega_k$, where i=1, 2, . . . ). In some cases, the lowest delta frequency may have a greater signal strength (e.g., RSRP) compared to a higher delta frequency, whereas the higher delta frequency may have a greater signal quality (e.g., SINR) compared to the lowest delta frequency.

FIG. 7 is a diagram illustrating an example receiver architecture 700 for multi-carrier OOK signal demodulation. In some cases, the receiver architecture 700 may be referred to as a two-stage rectifier architecture. The receiver architecture 700 may be implemented in a transceiver, such as the transceiver(s) 354 of FIG. 3. In certain aspects, the receiver architecture 700 may be implemented at or on a passive or semi-passive IoT device. The receiver architecture 700 may be low complexity and low cost for IoT applications. The receiver architecture 700 may enable enhanced reception performance due to the two-stage rectifier architecture that enhances the modulation signal with frequency diversity as further described herein.

The receiver architecture 700 may include one or more antennas 702, a first rectifier 704, one or more first filters 706A-N (collectively the first filters 706), a second rectifier 708, a second filter 710, one or more processors 712 (collectively the processor 712), and one or more memories 714 (collectively the memory 714).

A multi-carrier OOK signal (e.g., x(t)) received via the antenna(s) 702 may be rectified by the first rectifier 704, which outputs a rectified signal (e.g., r(t)). The first rectifier 704 may be or include a full-wave rectifier that converts the waveform of the received signal to a particular polarity (e.g., +1). The rectified signal r (t) may have multiple delta frequency components ($r_i(t), \ldots, r_j(t)$) depending on the number of carriers used to form the multi-carrier OOK signal, for example, as described herein with respect to Expression (7). An input 720 of the first rectifier 704 is coupled to the antenna(s) 702, and an output 722 of the first rectifier 704 is coupled to input(s) 724 of the first filter 706.

Any or all of the first filters 706 may be or include one or more bandpass filters. As a representative example of any of the first filters 706, the first filter 706a may have a tunable center frequency and/or pass bands that allows one or more delta frequency components to pass. In certain cases, the first filters 706 may include multiple bandpass filters having different center frequencies and/or pass bands. The first filter 706a may reject noise and interference including some of the delta frequency components (e.g., the $r_0(t)$ component) and/or other frequency division multiplexing (FDM) interference outside the passband. The delta frequency component(s) allowed to pass through the first filter 706a mays be selected to mitigate certain effects of signal propagation, such as interference, noise, fading, and/or scattering. In certain aspects, the processor 712 may select the delta frequency component(s) and the corresponding tuning for the first filter 706a. For example, the processor 712 may select the delta frequency component(s) that has the highest signal strength (e.g., a received signal strength indicator (RSSI)) and/or quality (e.g., signal-to-noise ratio). Each of the bandpass filters may have a different passband that allows at least one of the delta frequencies to pass through the respective bandpass filter. In other words, at least one of the delta frequencies may be within the passband(s) of the first filter 706a. In some cases, the bandpass filters may have center frequencies that match one or more of the delta frequencies. In certain cases, the processor 712 may control the tuning associated with the first filter 706a. For example, the processor 712 may adjust or tune the first filter 706a to have a passband that allows at least one of the delta frequencies to pass through the first filter 706a. As the delta frequency component(s) are effectively low frequency baseband signals, the first rectifier 704 and the first filter(s) 706 recover the baseband signals without active RF components, such as a frequency synthesizer, mixer(s), and frequency synchronization, allowing for a low complexity and low cost receiver architecture, especially for passive or semi-passive IoT devices.

The second rectifier 708 may be or include a full-wave rectifier. Output(s) 726 of the first filter 706 are coupled to an input 728 of the second rectifier 708, and an output 730 of the second rectifier 708 is coupled to an input 732 of the second filter 710. The delta frequency component(s) may be rectified using the second rectifier 708 to perform a subsequent stage of envelope tracking on the delta frequency component(s) and output a second rectified signal (g(t)). In general, the second stage of rectification may enhance the amplitude modulation signal and improve the performance of the receiver architecture. For example, the second stage of rectification may combine any of the delta frequency component(s) allowed to pass through the first filter 706 and output the peaks of the amplitude modulation signal (e.g., 1−a(t)), which is effectively modulated on the delta frequency component(s) as described herein with respect to Expression (7). In some cases, the delta frequency component(s) allowed to pass through the first filter 706 may be selected to avoid or mitigate interference, selective frequency fading, and/or noise.

The second filter 710 may be or include a low pass filter that recovers the amplitude modulation signal (e.g., 1−a(t)) and rejects any of the delta frequency component(s). That is, the second filter 710 is configured to output a decoded signal representative of the payload of the multi-carrier OOK signal. In this example, the decoded signal may include the amplitude modulation signal. An output 730 of the second rectifier 708 is coupled to an input 732 of the second filter, and an output 734 of the second filter 708 is coupled to the processor 712. In some aspects, the low pass filter may perform DC component rejection. As the amplitude modulation signal is effectively a digital signal, the second filter 710 may output the filtered signal to the processor 712 without any analog to digital conversion, allowing for a receiver architecture that enables reduced complexity, reduced cost, reduced power consumption, and/or a reduced footprint, especially for passive or semi-passive IoT devices. In certain cases, the processor 712 may control the tuning associated with the second filter 710. For example, the processor 712 may adjust or tune the second filter 710 to have a passband that allows the modulation signal to pass through the second filter 710.

The processor 712 may recover the information payload represented by the amplitude modulation signal and carried via the multi-carrier OOK signal. For example, the amplitude modulation signal may effectively be a digital signal representing the information payload as a sequence of amplitudes (e.g., a binary signal having two amplitudes), where each amplitude may correspond a particular value (e.g., one or more combination of bit values). In some cases, the processor 712 may control the operation of the two-stage rectifier, for example, by selecting one or more delta frequencies used for decoding the multi-carrier OOK signal and tuning the filters 706, 710 as described herein. In certain cases, the information payload may be or include certain instructions or controls for a passive or semi-passive IoT device. In some cases, the information payload may be or include a certain identification information for the IoT device to store in the memory 714. In certain cases, the information payload may be or include a request for the IoT device to respond with certain identification information.

The memory 714 may store data (e.g., the decoded information payload) and/or program codes (e.g., computer-readable instructions) for performing any of the operations described herein.

Example Set of Delta Frequencies

Figures 8A, 8B:
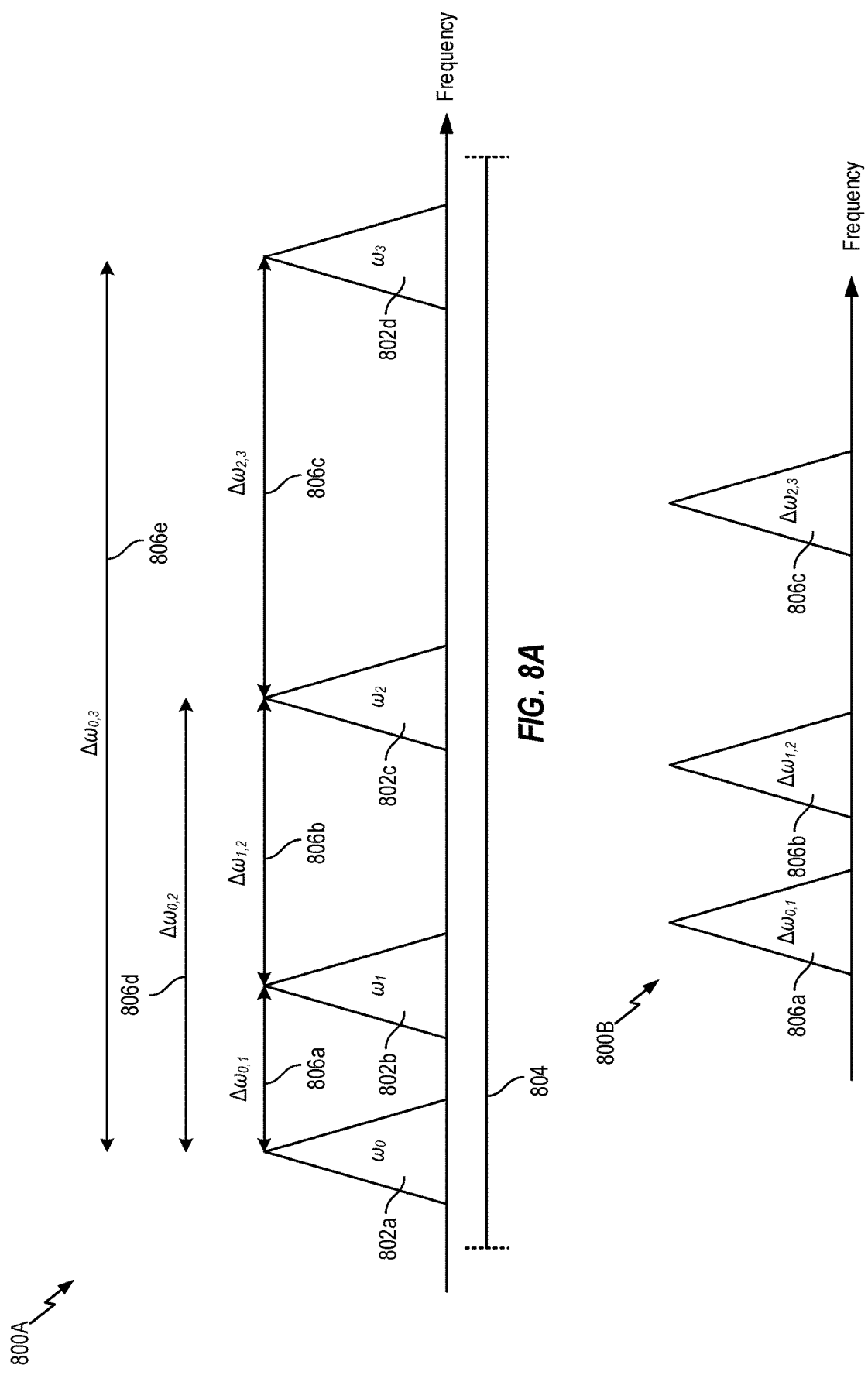
FIGS. 8A and 8B depict spectral densities of an example multi-carrier OOK signal and corresponding delta frequency components, respectively.

FIGS. 8A and 8B depict spectral densities 800A and 800B of an example multi-carrier OOK signal and corresponding delta frequency components, respectively. As described herein, a multi-carrier OOK signal may provide frequency diversity for low complexity, low cost wireless communication devices (e.g., ambient IoTs) and enhance the reception performance of such devices.

Referring to FIG. 8A, a multi-carrier OOK signal may include a plurality of carrier frequencies, @0-@3, 802a-d (collectively the carrier frequencies 802) modulated with the same OOK signal. The carrier frequencies 802 may be arranged in a frequency band 804, and the carrier frequencies 802 may be arranged with equal spacing (e.g., the same gap) between adjacent carrier frequencies (e.g., 802a and 802b) or different spacing between adjacent carrier frequencies. Adjacent carrier frequencies (e.g., 802a and 802b) may refer to carrier frequencies that are consecutive to each other in a sequence of the carrier frequencies (e.g., {802a, 802b, 802c, 802d}) arranged in ascending order in terms of frequency. An adjacent carrier frequency may refer to a carrier frequency that is next to another carrier frequency in the sequence of carrier frequencies arranged in ascending order in terms of frequency. In this example, the carrier frequencies 802 are arranged in the frequency band 804 with a different frequency spacing between adjacent carrier frequencies. The frequency spacing between adjacent carriers may be selected to form different delta frequencies 806a-e (collectively the delta frequencies 806), and thus, provide frequency diversity for the OOK signal demodulation using the receiver architecture described herein with respect to FIG. 7.

In certain aspects, the set of delta frequencies 806 may depend on the frequency band 804. For example, a configuration may define an association between the set of delta frequencies 806 and the frequency band 804. In such cases, an indication that the multi-carrier OOK signal is in the frequency band 804 may implicitly indicate that the set of delta frequencies 806 are candidates for demodulation (e.g., allowing to pass through the first filter 706).

The carrier frequencies 802 may include a first carrier frequency 802a and a second carrier frequency 802b, which is adjacent to the first carrier frequency. In some cases, the delta frequency 806a, which defines the difference between the first carrier frequency 802a and the second carrier frequency 802b, may be used for demodulation. For example, the first filter 706 may allow the delta frequency 806a to pass through the pass band. The second carrier frequency 802b may be arranged between the first carrier frequency 802a and the third carrier frequency 802c. In certain cases, the delta frequency 806d, which defines the different between the first carrier frequency 802a and the third carrier frequency 802c, may be used for demodulation. For example, the first filter 706 may allow the delta frequency 806d to pass through the pass band.

With respect to FIGS. 8A and 8B, a delta frequency 806a-e may define a difference between two center frequencies of the carrier frequencies among the plurality of carrier frequencies 802. Note that only a subset of the delta frequencies is depicted in FIGS. 8A and 8B. There may be various carrier frequency pairs, which form delta frequencies, among the plurality of carrier frequencies 802. For example, a first delta frequency, $\Delta\omega_{0,1}$, 806a is the difference between the first carrier frequency 802a and the second carrier frequency 802b; a second delta frequency, $\Delta\omega_{1,2}$, 802b is the difference between the second carrier frequency 802b and the third carrier frequency 802c; and so on for the remaining delta frequencies formed via carrier frequency pairs among the plurality of carrier frequencies 802. As the receiver architecture described herein with respect to FIG. 7 recovers one or more of the delta frequencies 806, the receiving device can process one or more of the delta frequencies 806 without knowing the actual carrier frequencies 802. The transmitting device can select the carrier frequencies 802 to form the delta frequencies 806 that mitigate against effects of signal propagation (e.g., interference, noise, fading, scattering, etc.).

With respect to FIG. 8B, the delta frequencies 806a, 806b, 806c may be an example of the one or more delta frequencies allowed to pass through the first filter(s) 706 of FIG. 7. For example, at least one of the delta frequencies 806a, 806b, 806c may be in the pass band(s) of the first filter(s) 706. The delta frequency used for the demodulation may be selected based on the channel conditions of the communication channel, such as interference, noise, fading, scattering, etc. For example, the first delta frequency 806a may be selected for demodulation (e.g., allowed to pass through the first filter(s) 706) due to the first delta frequency 806a being outside an interference bandwidth on the communication channel between the transmitter and receiver.

FIGS. 9A and 9B depict example spectral densities 900A and 900B of delta frequency components associated with a multi-carrier OOK signal under different channel conditions. With respect to FIG. 9A, the transmitter may output a multi-carrier OOK signal that results in delta frequencies 902a-d (collectively the delta frequencies 902). In this example, the third delta frequency 902c may be attenuated due to effects of signal propagation, such as interference, noise, fading, scattering, etc. In some cases, the transmitter may signal to the receiver to use any of the other delta frequencies 902a, 902b, 902d for demodulation of the multi-carrier OOK signals. In certain cases, the receiver may detect that at least one of the other delta frequencies 902a, 902b, 902d provides better signal quality and/or strength compared to the third delta frequency 902c for purposes of demodulation. As an example, the receiver may tune the first filter(s) 706 to allow at least one of the other delta frequencies 902a, 902b, 902d to pass through the pass band and continue through the subsequent demodulation stages (e.g., the second rectifier 708 and second filter 710). For example, the processor 712 may control the tuning of the first filter(s) 706 to allow at least one of the other delta frequencies 902a, 902b, 902d to pass through the pass band.

With respect to FIG. 9B, the third delta frequency 904c may exhibit the best signal quality and/or strength compared to the other delta frequencies 904a, 904b, 904c. In this example, the receiver may tune the first filter(s) 706 to allow the third delta frequency 904c to pass through the pass band and continue through the subsequent demodulation stages (e.g., the second rectifier 708 and second filter 710). For example, the processor 712 may control the tuning of the first filter(s) 706 to allow the third delta frequency 904c to pass through the pass band. Thus, FIGS. 9A and 9B demonstrates that a multi-carrier OOK signal offers frequency diversity in selecting the delta frequency component(s) for demodulation.

In certain aspects, a set of delta frequencies to use for demodulation may be preconfigured at the receiver and/or transmitter. The transmitter may select the one or more delta frequencies from the preconfigured set of delta frequencies, and the receiver may be configured to process the multi-carrier OOK signal at the selected set of delta frequencies. In some cases, the transmitter may select the carrier frequencies to form the one or more delta frequencies and avoid and/or mitigate against certain effects of signal propagation, such as interference, noise, fading, scattering, etc.

In certain aspects, the transmitter may select the one or more delta frequencies for demodulation at the receiver in a closed-loop manner. For example, the receiver may send, to the transmitter, a request for the multi-carrier OOK signal to have one or more delta frequencies for demodulation. In some cases, the receiver may notify the transmitter of the one or more delta frequencies that the receiver is capable of processing. In certain cases, the receiver may evaluate the channel conditions and notify the transmitter of preferred delta frequencies for demodulation.

In certain aspects, the transmitter may select the one or more delta frequencies for demodulation at the receiver in an open loop manner. For example, the transmitter may select the one or more delta frequencies for demodulation without feedback from the receiver. The transmitter may evaluate the channel conditions and determine the one or more delta frequencies to use for demodulation at the receiver. In some cases, the transmitter may notify the receiver of at least one of the delta frequencies to use for demodulation. In certain cases, the receiver may be capable of detecting one or more delta frequencies, for example, via filter tuning at the first filter 706.

In certain aspects, the selection of the delta frequencies for demodulation may be performed at the receiver and/or the transmitter. In some cases, the receiver may select the delta frequencies for demodulation, for example, based on evaluating the channel conditions at the receiver. In certain cases, the receiver may obtain, from the transmitter, guidance on selecting the delta frequencies. For example, the receiver may obtain, from the transmitter, an indication of the interference or carrier frequencies of the OOK signal. The receiver may obtain an indication of the channel conditions of the communication channel between the transmitter and the receiver, for example, in terms of the bandwidth and/or PSD of the interference observed at the transmitter.

In certain aspects, the receiver may determine the delta frequencies using any of various techniques. In some cases, the receiver may obtain signaling indicating the delta frequencies, for example, via system information. In certain cases, the delta frequencies may depend on the frequency band (or any other suitable aspect) used for communications between the transmitter and the receiver. In some cases, the delta frequencies may be dynamically indicated, for example, via a downlink control information. In certain cases, the receiver may perform blind detection to determine the delta frequencies. For example, the receiver may adjust the tuning of the first filters 706 to sweep through candidate delta frequencies to detect any delta frequencies in the received signal.

Example Operations of Entities in a Communications Network

Figure 10:
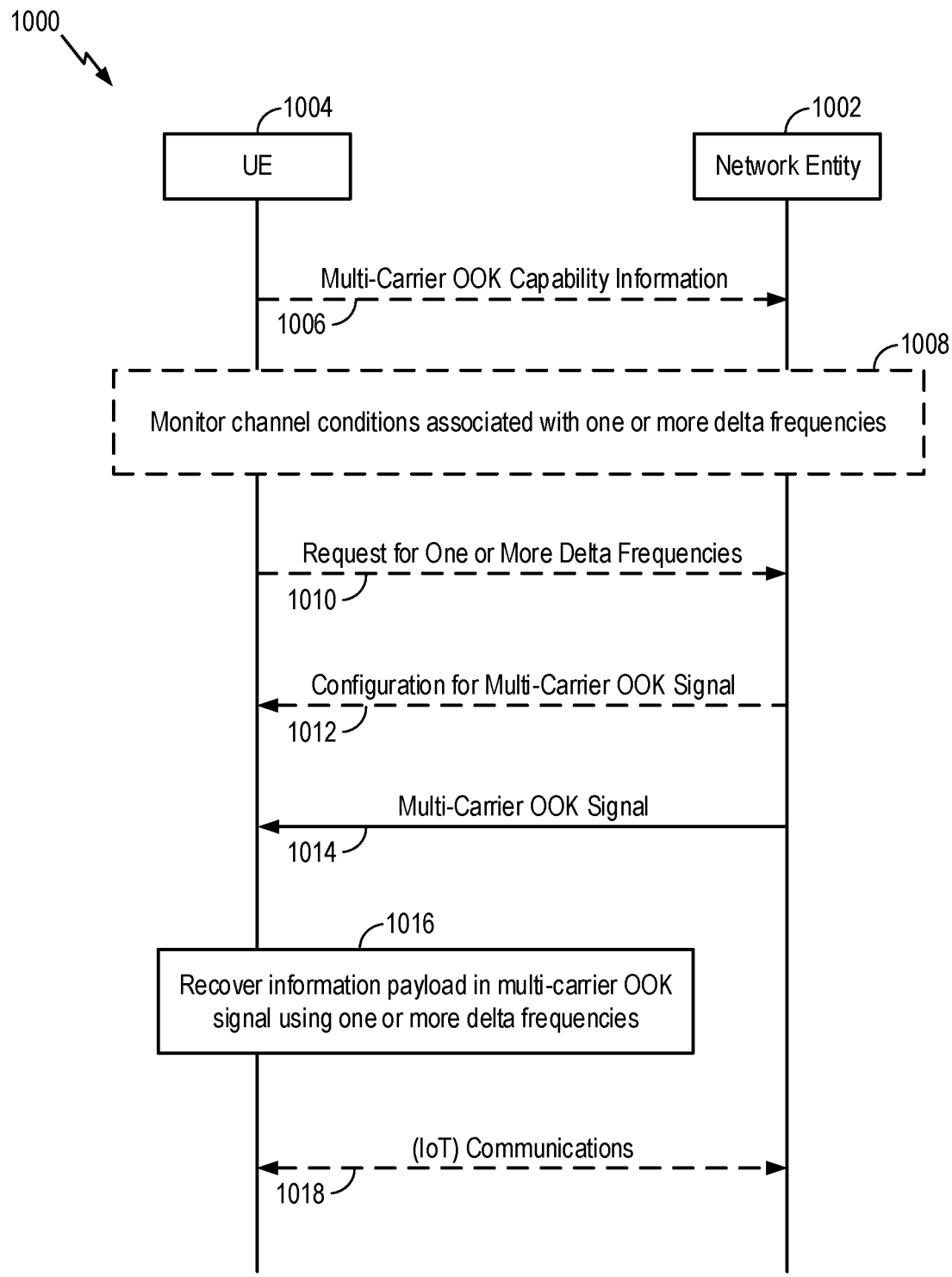
FIG. 10 depicts a process flow for communications in a network between a network entity and a UE.

FIG. 10 depicts a process flow 1000 for communications in a network between a network entity 1002 and a user equipment (UE) 1004. In some aspects, the network entity 1002 may be an example of the BS 102 depicted and described with respect to FIGS. 1 and 3 or a disaggregated base station depicted and described with respect to FIG. 2. Similarly, the UE 1004 may be an example of UE 104 depicted and described with respect to FIGS. 1 and 3. However, in certain aspects, UE 1004 may be another type of wireless communications device, and network entity 1002 may be another type of network entity, network node, and/or another UE. For example, the network entity 1002 may be a wireless communication device that communicates with IoT devices (such as an IoT identification tag reader or sensor controller), and the UE 1004 may be an ambient IoT device, such as an IoT identification tag and/or IoT sensor. In certain aspects, the multi-carrier OOK signal may be used for other communications or types of devices besides IoT communications and/or IoT devices.

At 1006, the UE 1004 may send, to the network entity 1002, capability information indicating the capabilities of the UE 1004 to demodulate a multi-carrier OOK signal. In some cases, the capability information may indicate that the UE 1004 is capable of demodulating the delta frequencies of a multi-carrier OOK signal. In certain cases, the capability information may indicate the delta frequencies that the UE 1004 is capable of demodulating, for example, as a frequency range of delta frequencies, or as one or more pass bands associated the filtering at the first filter 706. The capability information may indicate whether the UE 1004 is capable of monitoring channel conditions at the carrier frequencies and/or delta frequencies.

At 1008, the UE 1004 and/or the network entity 1002 may monitor the channel conditions associated with one or more delta frequencies. The UE 1004 and/or network entity 1002 may monitor the channel conditions at the carrier frequencies of the multi-carrier OOK signal and/or the delta frequencies. For example, the UE 1004 and/or network entity 1002 may observe the channel conditions associated with the delta frequencies as described herein with respect to FIGS. 9A and 9B. The UE 1004 and/or the network entity 1002 may select the delta frequency for demodulation based on the monitored channel conditions. For example, the UE 1004 and/or the network entity 1002 may select the delta frequency that exhibits the greatest signal quality and/or signal strength. In some cases, the network entity 1002 may select the carrier frequencies that form the delta frequencies based on the monitored channel conditions. For example, the network entity 1002 may select the carrier frequencies and/or delta frequencies that avoid and/or mitigate interference (or other signal propagation effects).

At 1010, the UE 1004 may send a request for one or more delta frequencies. The request may represent a preferred set of delta frequencies to use for demodulation at the UE 1004. In some cases, the preferred set of delta frequencies may be determined from the monitored channel conditions. For example, the UE 1004 may select the preferred set of delta frequencies based on the preferred set of delta frequencies avoiding interference as determined from the monitored channel conditions.

At 1012, the UE 1004 may receive a configuration for the multi-carrier OOK signal. In certain aspects, the configuration of the multi-carrier OOK signal may be received via RRC signaling, MAC signaling, DCI, sidelink control information (SCI), and/or system information. In some cases, the configuration may be or include a resource allocation for the multi-carrier OOK signal. In certain cases, the configuration may indicate candidate delta frequencies that might be formed from the multi-carrier OOK signal. The candidate delta frequencies may allow the UE 1004 to perform blind detection of the delta frequencies. For example, the UE 1004 may sweep through the candidate delta frequencies to detect which one is being used to carry the amplitude modulation signal. The configuration may indicate the frequency spacing (or frequency gaps) between carrier frequencies of the multi-carrier OOK signal, and the frequency spacing may implicitly indicate the delta frequencies that can be used for demodulation at the UE 1004. In certain aspects, the configuration may implicitly indicate the delta frequencies to use for the demodulation. For example, the delta frequencies may depend on the frequency band on which the multi-carrier OOK signal is communicated, and the configuration may indicate such a frequency band. In other words, the UE 1004 may be configured with a frequency band to delta frequency mapping, and the configuration may indicate that the multi-carrier OOK signal will be transmitted in a frequency band that is associated with specific delta frequencies as identified in the mapping.

At 1014, the UE 1004 receives a multi-carrier OOK signal from the network entity 1002. As an example, the multi-carrier OOK signal may have carrier frequencies and form the delta frequencies as described herein with respect to FIGS. 8A and 8B. The same OOK signal may be modulated on different carrier frequencies to facilitate frequency diversity.

At 1016, the UE 1004 recovers an information payload carried in the multi-carrier OOK signal using one or more delta frequencies. For example, the information payload may include control information, application data, etc. In certain aspects, the UE 1004 may have a receiver architecture as described herein with respect to FIG. 7, and the UE 1004 may decode the received signal using the receiver architecture 700. The decoded signal may represent the information as a sequence of amplitudes (e.g., as a binary signal) over time. To recover the information, the UE 1004 may convert the sequence of amplitudes into the information. Such a receiver architecture may allow the UE 1004 to decode the received signal using reduced power consumption and with reduced complexity. In some cases, the low power consumption of the receiver architecture may allow the UE 1004 to be an ambient IoT device that harvests energy from the ambient environment. Thus, the receiver architecture may enable the beneficial effects described herein, such as low power consumption, low complexity, increased data rates, reduced latency, increased reliability, etc.

At 1018, the UE 1004 may communicate with the network entity 1002. For example, as an IoT device, the UE 1004 may periodically send IoT information (such as sensor measurements and/or identification information) to the network entity 1002. In some cases, the network entity 1002 may request IoT information from the UE 1004, and the UE 1004 may respond with the IoT information. The communications between the UE 1004 and/or the network entity 1002 may use a multi-carrier OOK signal and/or the receiver architecture described herein.

Note that FIG. 10 is just one example of a flow chart, and other flows including fewer, additional, or alternative operations are possible consistent with this disclosure. The operations depicted with dashed lines may be optional.

Example Operations

Figure 11:
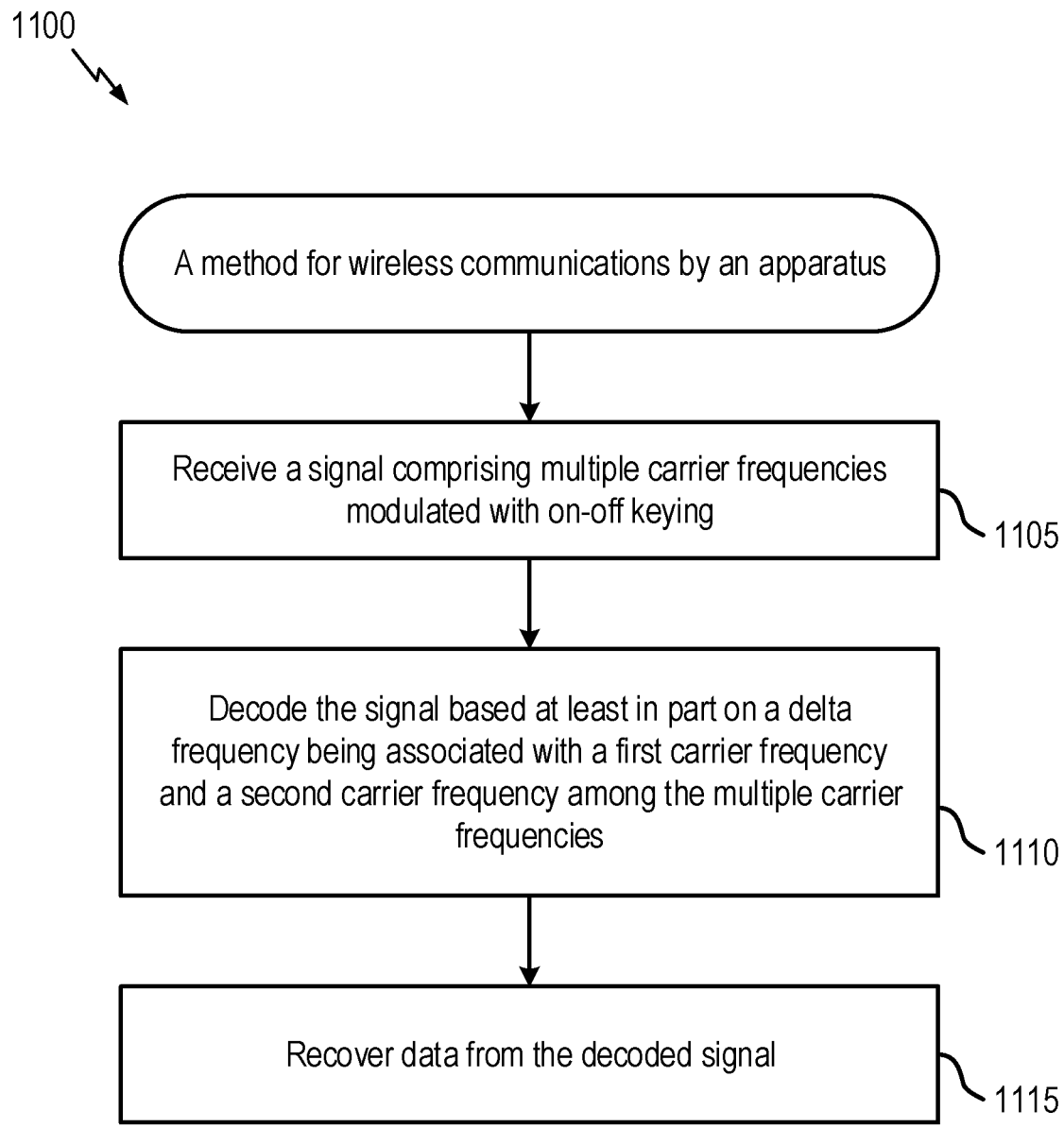
FIG. 11 depicts a method for wireless communications.

FIG. 11 shows a method 1100 for wireless communications by an apparatus, such as UE 104 of FIGS. 1 and 3. In certain aspects, the apparatus may include an IoT device, such as an ambient IoT device as described herein with respect to FIGS. 5 and 6.

Method 1100 begins at block 1105 with receiving a signal comprising multiple carrier frequencies modulated with on-off keying (OOK). In certain aspects, the same OOK signal is modulated on the carrier frequencies, for example, as described herein with respect to Expression (4). The signal may have multiple carrier frequency components and delta frequency components, for example, as described herein with respect to FIG. 8A.

Method 1100 then proceeds to block 1110 with decoding the signal based at least in part on a delta frequency being associated with a first carrier frequency and a second carrier frequency among the multiple carrier frequencies. For example, the signal may be decoded using the two-stage rectifier architecture described herein with respect to FIG. 7. One or more processors may control the signal processing flow associated with the two-stage rectifier architecture. For example, a processor may adjust the tuning applied at a filtering stage to select the delta frequency components used for decoding the signal. Such a receiver architecture may enable a low power, low complexity receiver for ambient IoT communications.

Method 1100 then proceeds to block 1115 with recovering data from the decoded signal. For example, the recovered data may carry control information and/or application data. In some cases, the recovered data may be stored in memory.

In certain aspects, the delta frequency defines a difference between the first carrier frequency and the second carrier frequency, for example, as described herein with respect to FIG. 8A.

In certain aspects, the apparatus includes: a first rectifier (e.g., the first rectifier 704) having an input and an output; a first filter (e.g., the first filter(s) 706) having an input coupled to the output of first rectifier and having an output; a second rectifier (e.g., the second rectifier 708) having an input coupled to the output of first filter and having an output; and a second filter (e.g., the second filter 710) having an input coupled to the output of second rectifier.

In certain aspects, the first rectifier is configured to rectify the signal and to output a first rectified signal; the first filter is configured to filter the first rectified signal in one or more pass bands and to output a first filtered signal, wherein the delta frequency is in at least one of the one or more pass bands; the second rectifier is configured to rectify the first filtered signal and to output a second rectified signal; and the second filter is configured to filter the second rectified signal and to output a modulation amplitude signal as the decoded signal.

In certain aspects, the second carrier frequency is adjacent to the first carrier frequency. For example, the first carrier frequency may be the carrier frequency 802c, and the second carrier frequency may be the carrier frequency 802d. In such cases, the delta frequency may be relatively low and reside outside of an interference bandwidth on the communication channel. The delta frequency may be selected to mitigate against effects of signal propagation (e.g., interference, noise, fading, scattering, etc.).

In certain aspects, the first carrier frequency corresponds to a lowest carrier frequency (e.g., the first carrier frequency 802a) among the multiple carrier frequencies, and the second carrier frequency is adjacent to the first carrier frequency. For example, the second carrier frequency is the carrier frequency 802b.

In certain aspects, the multiple carrier frequencies include a third carrier frequency arranged between the first carrier frequency and the second carrier frequency. For example, the first carrier frequency may be the carrier frequency 802b, and the second carrier frequency may be the carrier frequency 802d. As another example, the first carrier frequency may be the carrier frequency 802a, and the second carrier frequency may be the carrier frequency 802d. In such cases, the delta frequency may be selected to mitigate against effects of signal propagation (e.g., interference, noise, fading, scattering, etc.).

In certain aspects, block 1110 includes decoding the signal based at least in part on a plurality of delta frequencies, including the delta frequency, associated with the multiple carrier frequencies. For example, the first filter 706a may be tuned to allow multiple delta frequencies to pass through the pass band.

In certain aspects, method 1100 further includes monitoring for interference (and/or other effects of signal propagation) associated with the signal, wherein block 1110 includes decoding the signal based at least in part on the monitored interference, for example, as described herein with respect to FIG. 10.

In certain aspects, method 1100 further includes receiving an indication of at least one of the plurality of delta frequencies to use for decoding, for example, as described herein with respect to FIG. 10.

In certain aspects, method 1100 further includes sending an indication of one or more delta frequencies that the apparatus is capable of using for decoding the signal, wherein the one or more delta frequencies includes the delta frequency. For example, the apparatus may send the indication as capability information for decoding a multi-carrier OOK signal.

In certain aspects, method 1100 further includes receiving an indication of one or more frequency spacings arranged among the multiple carrier frequencies. In certain aspects, receiving the indication of the one or more frequency spacings arranged among the multiple carrier frequencies comprises receiving the indication via at least one of RRC signaling, MAC signaling, DCI, SCI, or system information.

In certain aspects, one or more frequency spacings arranged among the multiple carrier frequencies are defined based on a frequency band including the multiple carrier frequencies. In some cases, the apparatus may be configured with a mapping of sets of delta frequencies to frequency bands. For example, a first set of delta frequencies may map to a first frequency band, and a second set of delta frequencies may map to a second frequency band.

In certain aspects, block 1110 includes decoding the signal based at least in part on a blind detection of the delta frequency. For example, the apparatus may sweep through candidate delta frequencies to identify the set of delta frequencies to use for demodulation.

In certain aspects, method 1100 further includes receiving an indication of the multiple carrier frequencies associated with the signal, wherein block 1110 includes decoding the signal based on the indication of the multiple carrier frequencies. For example, the apparatus may determine a set of delta frequencies associated with the carrier frequencies, for example, as described herein with respect to FIG. 8A, and the apparatus may use the set of delta frequencies for demodulation, for example, by tuning the first filter 706 to allow at least one of the delta frequencies to pass through the pass band.

Figure 13:
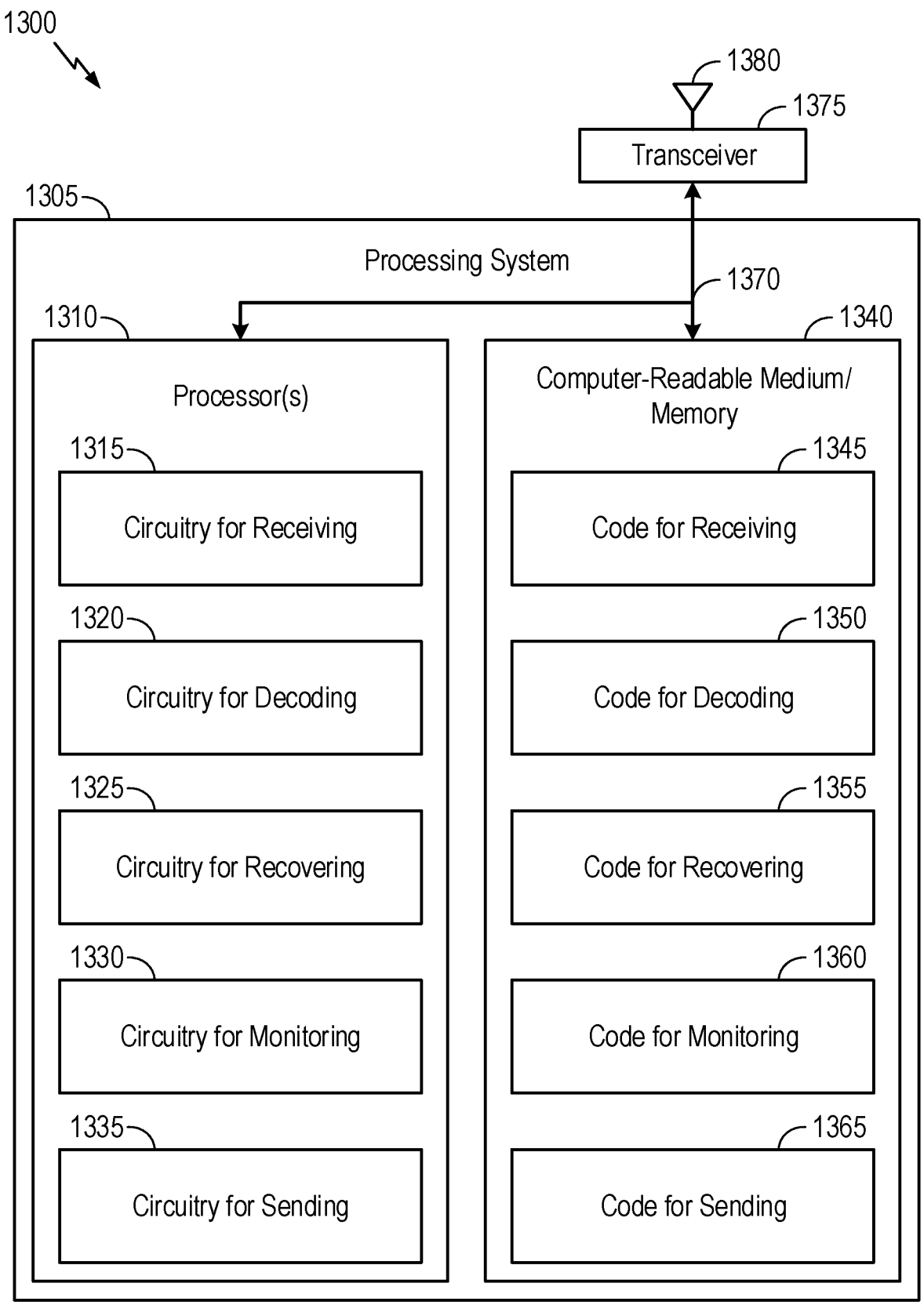
FIG. 13 depicts aspects of an example communications device.

In certain aspects, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative operations are possible consistent with this disclosure.

Figure 12:
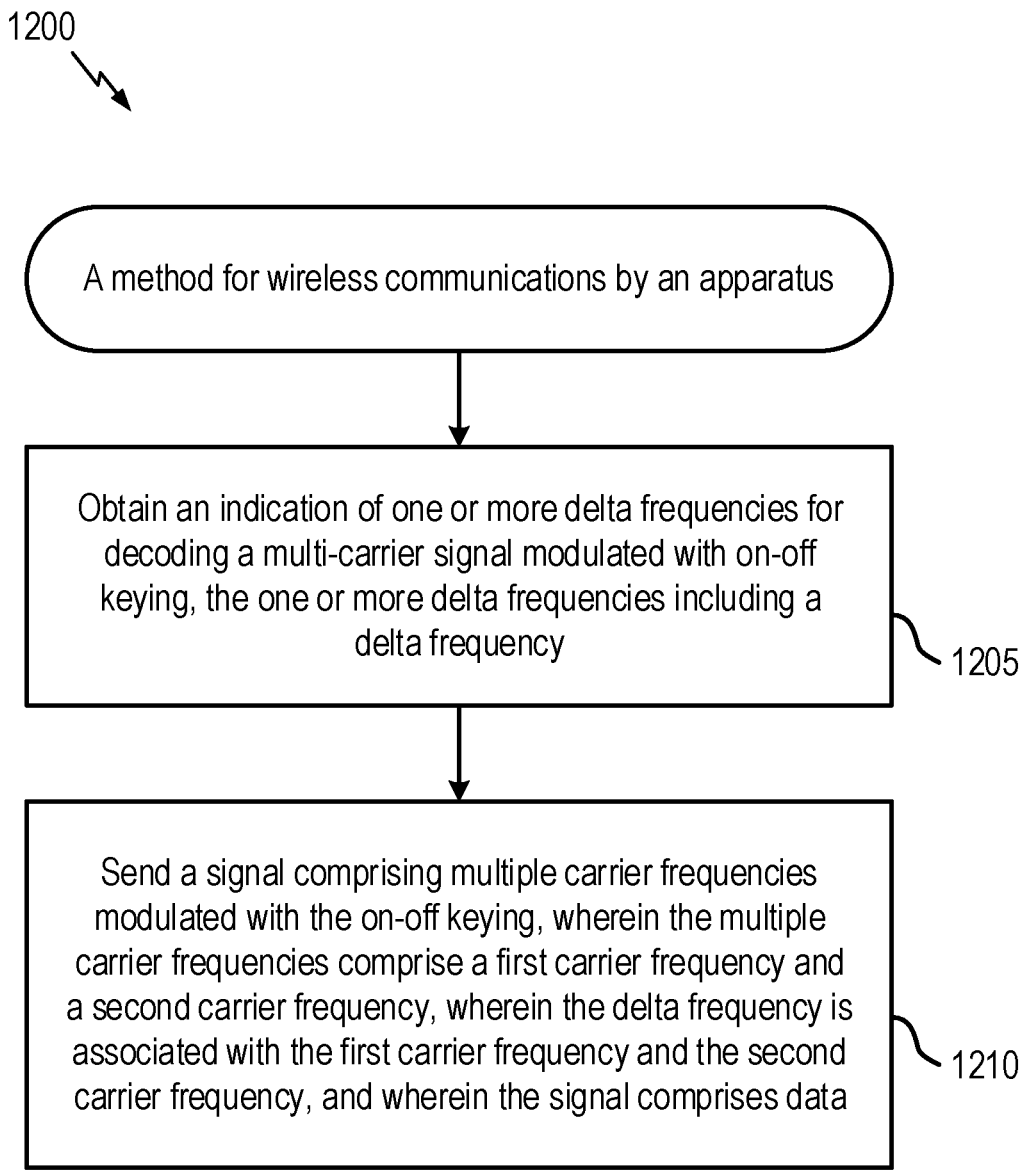
FIG. 12 depicts another method for wireless communications.

FIG. 12 shows a method 1200 for wireless communications by an apparatus, such as BS 102 of FIGS. 1 and 3, or a disaggregated base station as discussed with respect to FIG. 2. In certain aspects, the apparatus may include a UE, such as the UE 104 of FIGS. 1 and 3. As an example, the apparatus may include an IoT tag reader.

Method 1200 begins at block 1205 with obtaining an indication of one or more delta frequencies for decoding a multi-carrier signal modulated with on-off keying, the one or more delta frequencies including a delta frequency. For example, the apparatus may be preconfigured with the one or more delta frequencies. In some cases, the network entity may obtain the indication of the one or more delta frequencies from a UE, for example, as a request to use the one or more delta frequencies and/or as capability information.

Method 1200 then proceeds to block 1210 with sending a signal comprising multiple carrier frequencies modulated with the on-off keying, wherein the multiple carrier frequencies comprise a first carrier frequency and a second carrier frequency, wherein the delta frequency is associated with the first carrier frequency and the second carrier frequency, and wherein the signal comprises data.

In certain aspects, the delta frequency defines a difference between the first carrier frequency and the second carrier frequency.

In certain aspects, the second carrier frequency is adjacent to the first carrier frequency. For example, the first carrier frequency may be the carrier frequency 802c, and the second carrier frequency may be the carrier frequency 802d.

In certain aspects, the first carrier frequency corresponds to a lowest carrier frequency (e.g., the first carrier frequency 802a) among the multiple carrier frequencies, and the second carrier frequency is adjacent to the first carrier frequency. For example, the second carrier frequency is the carrier frequency 802b.

In certain aspects, the multiple carrier frequencies include a third carrier frequency arranged between the first carrier frequency and the second carrier frequency. For example, the first carrier frequency may be the carrier frequency 802b, and the second carrier frequency may be the carrier frequency 802d. As another example, the first carrier frequency may be the carrier frequency 802a, and the second carrier frequency may be the carrier frequency 802d.

In certain aspects, method 1200 further includes monitoring for interference (and/or other effects of signal propagation) associated with the signal, for example, as described herein with respect to FIG. 10.

In certain aspects, method 1200 further includes selecting the multiple carrier frequencies that form the one or more delta frequencies. In some cases, the apparatus may select the multiple carrier frequencies based on the monitored interference, for example, as described herein with respect to FIG. 10.

In certain aspects, method 1200 further includes sending the indication of the one or more delta frequencies for decoding.

In certain aspects, method 1200 further includes obtaining an indication of one or more delta frequencies that another apparatus is capable of using for decoding the signal, wherein the one or more delta frequencies includes the delta frequency.

In certain aspects, method 1200 further includes sending an indication of one or more frequency spacings arranged among the multiple carrier frequencies. In certain aspects, sending the indication of the one or more frequency spacings arranged among the multiple carrier frequencies comprises sending the indication via at least one of RRC signaling, MAC signaling, DCI, SCI, or system information.

In certain aspects, one or more frequency spacings arranged among the multiple carrier frequencies are defined based on a frequency band including the multiple carrier frequencies. In some cases, the apparatus may be configured with a mapping of sets of delta frequencies to frequency bands. For example, first set of delta frequencies may map to a first frequency band, and a second set of delta frequencies may map to a second frequency band.

In certain aspects, method 1200 further includes sending an indication of the multiple carrier frequencies associated with the signal.

Figure 14:
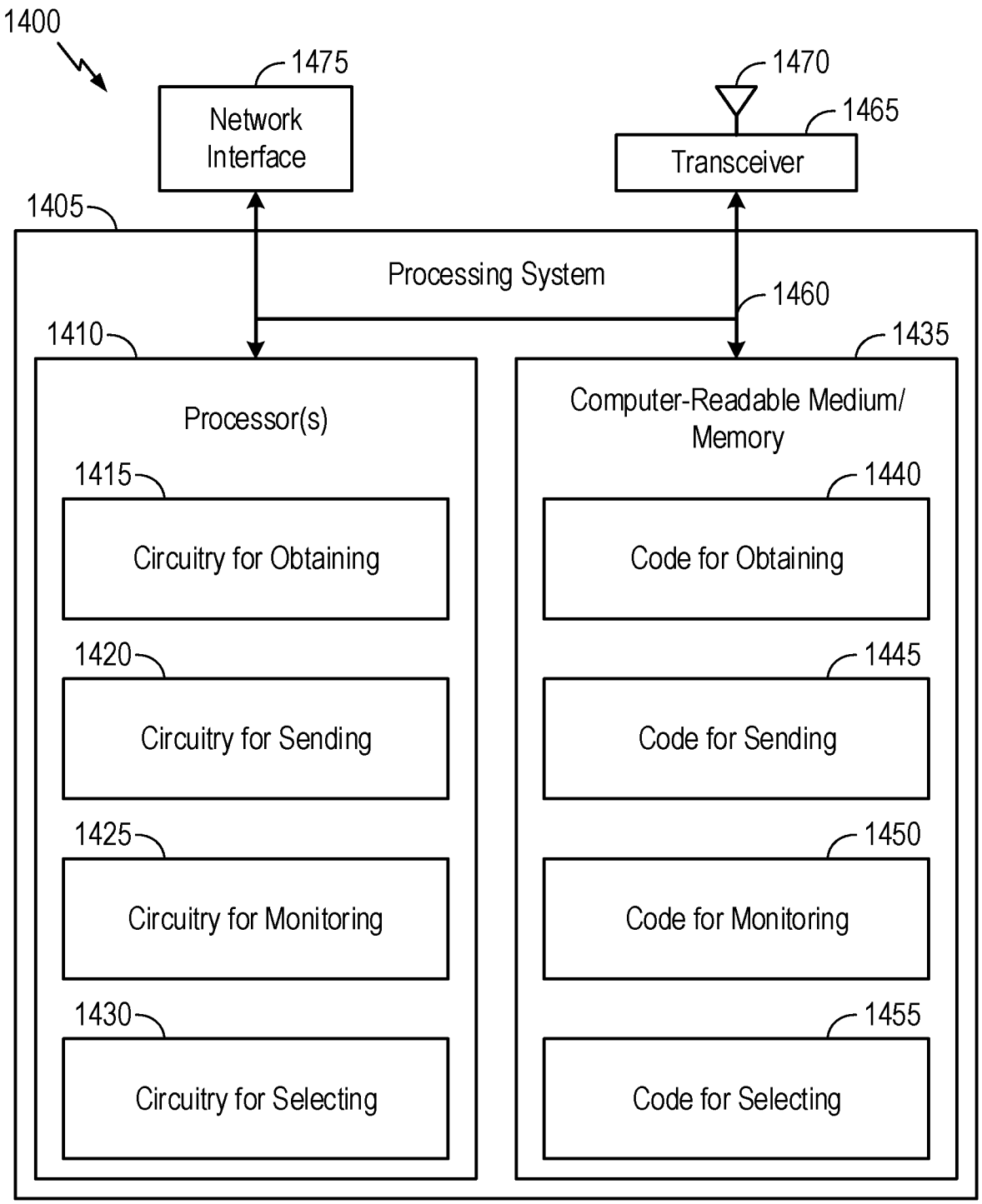
FIG. 14 depicts aspects of an example communications device.

In certain aspects, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative operations are possible consistent with this disclosure.

Example Communications Devices

FIG. 13 depicts aspects of an example communications device 1300. In some aspects, communications device 1300 is a user equipment, such as UE 104 described above with respect to FIGS. 1 and 3.

The communications device 1300 includes a processing system 1305 coupled to a transceiver 1375 (e.g., a transmitter and/or a receiver). The transceiver 1375 is configured to transmit and receive signals for the communications device 1300 via an antenna 1380, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1340 via a bus 1370. In certain aspects, the computer-readable medium/memory 1340 is configured to store instructions (e.g., computer-executable code) that when executed by the one or more processors 1310, enable and cause the one or more processors 1310 to perform the method 1100 described with respect to FIG. 11, or any aspect related to it, including any additional operations described in relation to FIG. 11. Note that reference to a processor performing a function of communications device 1300 may include one or more processors performing that function of communications device 1300, such as in a distributed fashion.

In the depicted example, computer-readable medium/memory 1340 stores code for receiving 1345, code for decoding 1350, code for recovering 1355, code for monitoring 1360, and code for sending 1365. Processing of the code 1345-1365 may enable and cause the communications device 1300 to perform the method 1100 described with respect to FIG. 11, or any aspect related to it.

The one or more processors 1310 include circuitry configured to implement (e.g., execute) the code stored in the computer-readable medium/memory 1340, including circuitry for receiving 1315, circuitry for decoding 1320, circuitry for recovering 1325, circuitry for monitoring 1330, and circuitry for sending 1335. Processing with circuitry 1315-1335 may enable and cause the communications device 1300 to perform the method 1100 described with respect to FIG. 11, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1375 and/or antenna 1380 of the communications device 1300 in FIG. 13, and/or one or more processors 1310 of the communications device 1300 in FIG. 13. Means for communicating, receiving, or obtaining may include the receiver architecture 700 illustrated in FIG. 7, the transceivers 354, antenna(s) 352, receive processor 358, and/or controller/processor 380 of the UE 104 illustrated in FIG. 3, transceiver 1375 and/or antenna 1380 of the communications device 1300 in FIG. 13, and/or one or more processors 1310 of the communications device 1300 in FIG. 13. Means for decoding, recovering, or monitoring may include the receiver architecture 700 illustrated in FIG. 7, the transceivers 354, antenna(s) 352, receive processor 358, and/or controller/processor 380 of the UE 104 illustrated in FIG. 3, transceiver 1375 and/or antenna 1380 of the communications device 1300 in FIG. 13, and/or one or more processors 1310 of the communications device 1300 in FIG. 13.

FIG. 14 depicts aspects of an example communications device 1400. In some aspects, communications device 1400 is a network entity, such as BS 102 of FIGS. 1 and 3, or a disaggregated base station as discussed with respect to FIG. 2.

The communications device 1400 includes a processing system 1405 coupled to a transceiver 1465 (e.g., a transmitter and/or a receiver) and/or a network interface 1475. The transceiver 1465 is configured to transmit and receive signals for the communications device 1400 via an antenna 1470, such as the various signals as described herein. The network interface 1475 is configured to obtain and send signals for the communications device 1400 via communications link(s), such as a backhaul link, midhaul link, and/or fronthaul link as described herein, such as with respect to FIG. 2. The processing system 1405 may be configured to perform processing functions for the communications device 1400, including processing signals received and/or to be transmitted by the communications device 1400.

The processing system 1405 includes one or more processors 1410. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1435 via a bus 1460. In certain aspects, the computer-readable medium/memory 1435 is configured to store instructions (e.g., computer-executable code) that when executed by the one or more processors 1410, enable and cause the one or more processors 1410 to perform the method 1200 described with respect to FIG. 12, or any aspect related to it, including any additional operations described in relation to FIG. 12. Note that reference to a processor of communications device 1400 performing a function may include one or more processors of communications device 1400 performing that function, such as in a distributed fashion.

In the depicted example, the computer-readable medium/memory 1435 stores code for obtaining 1440, code for sending 1445, code for monitoring 1450, and code for selecting 1455. Processing of the code 1440-1455 may enable and cause the communications device 1400 to perform the method 1200 described with respect to FIG. 12, or any aspect related to it.

The one or more processors 1410 include circuitry configured to implement (e.g., execute) the code stored in the computer-readable medium/memory 1435, including circuitry for obtaining 1415, circuitry for sending 1420, circuitry for monitoring 1425, and circuitry for selecting 1430. Processing with circuitry 1415-1430 may enable and cause the communications device 1400 to perform the method 1200 described with respect to FIG. 12, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1465 and/or antenna 1470 of the communications device 1400 in FIG. 14, and/or one or more processors 1410 of the communications device 1400 in FIG. 14. Means for communicating, receiving or obtaining may include the transceivers 332, antenna(s) 334, receive processor 338, and/or controller/processor 340 of the BS 102 illustrated in FIG. 3, transceiver 1465 and/or antenna 1470 of the communications device 1400 in FIG. 14, and/or one or more processors 1410 of the communications device 1400 in FIG. 14.

EXAMPLE CLAUSES

Clause 1: A method for wireless communications by an apparatus comprising: receiving a signal comprising multiple carrier frequencies modulated with on-off keying; decoding the signal based at least in part on a delta frequency being associated with a first carrier frequency and a second carrier frequency among the multiple carrier frequencies; and recovering data from the decoded signal.

Clause 2: The method of Clause 1, wherein the delta frequency defines a difference between the first carrier frequency and the second carrier frequency.

Clause 3: The method of any one of Clauses 1-2, wherein the apparatus includes: a first rectifier having an input and an output; a first filter having an input coupled to the output of first rectifier and having an output; a second rectifier having an input coupled to the output of first filter and having an output; and a second filter having an input coupled to the output of the second rectifier.

Clause 4: The method of Clause 3, wherein: the first rectifier is configured to rectify the signal and to output a first rectified signal; the first filter is configured to filter the first rectified signal in one or more pass bands and to output a first filtered signal, wherein the delta frequency is in at least one of the one or more pass bands; the second rectifier is configured to rectify the first filtered signal and to output a second rectified signal; and the second filter is configured to filter the second rectified signal and to output a modulation amplitude signal as the decoded signal.

Clause 5: The method of any one of Clauses 1-4, wherein the second carrier frequency is adjacent to the first carrier frequency.

Clause 6: The method of any one of Clauses 1-4, wherein the multiple carrier frequencies include a third carrier frequency arranged between the first carrier frequency and the second carrier frequency.

Clause 7: The method of any one of Clauses 1-6, wherein decoding the signal comprises decoding the signal based at least in part on a plurality of delta frequencies, including the delta frequency, associated with the multiple carrier frequencies.

Clause 8: The method of Clause 7, further comprising: monitoring for interference associated with the signal, wherein decoding the signal comprises decoding the signal based at least in part on the monitored interference.

Clause 9: The method of Clause 7, further comprising receiving an indication of at least one of the plurality of delta frequencies to use for decoding.

Clause 10: The method of any one of Clauses 1-9, further comprising: sending an indication of one or more delta frequencies that the apparatus is capable of using for decoding the signal, wherein the one or more delta frequencies includes the delta frequency.

Clause 11: The method of any one of Clauses 1-10, further comprising receiving an indication of one or more frequency spacings arranged among the multiple carrier frequencies.

Clause 12: The method of Clause 11, wherein receiving the indication of the one or more frequency spacings arranged among the multiple carrier frequencies comprises receiving the indication via at least one of RRC signaling, MAC signaling, DCI, SCI, or system information.

Clause 13: The method of any one of Clauses 1-12, wherein one or more frequency spacings arranged among the multiple carrier frequencies are defined based on a frequency band including the multiple carrier frequencies.

Clause 14: The method of any one of Clauses 1-13, wherein decoding the signal comprises decoding the signal based at least in part on a blind detection of the delta frequency.

Clause 15: The method of any one of Clauses 1-14, further comprising: receiving an indication of the multiple carrier frequencies associated with the signal, wherein decoding the signal comprises decoding the signal based on the indication of the multiple carrier frequencies.

Clause 16: A method for wireless communications by an apparatus comprising: obtaining an indication of one or more delta frequencies for decoding a multi-carrier signal modulated with on-off keying, the one or more delta frequencies including a delta frequency; and sending a signal comprising multiple carrier frequencies modulated with the on-off keying, wherein the multiple carrier frequencies comprise a first carrier frequency and a second carrier frequency, wherein the delta frequency is associated with the first carrier frequency and the second carrier frequency, and wherein the signal comprises data.

Clause 17: The method of Clause 16, wherein the delta frequency defines a difference between the first carrier frequency and the second carrier frequency.

Clause 18: The method of any one of Clauses 16-17, wherein the second carrier frequency is adjacent to the first carrier frequency.

Clause 19: The method of any one of Clauses 16-17, wherein the multiple carrier frequencies include a third carrier frequency arranged between the first carrier frequency and the second carrier frequency.

Clause 20: The method of any one of Clauses 16-19, further comprising: monitoring for interference associated with the signal; and selecting the multiple carrier frequencies that form the one or more delta frequencies.

Clause 21: The method of any one of Clauses 16-20, further comprising: sending the indication of the one or more delta frequencies for decoding.

Clause 22: The method of any one of Clauses 16-21, further comprising: obtaining an indication of one or more delta frequencies that another apparatus is capable of using for decoding the signal, wherein the one or more delta frequencies includes the delta frequency.

Clause 23: The method of any one of Clauses 16-22, further comprising: sending an indication of one or more frequency spacings arranged among the multiple carrier frequencies.

Clause 24: The method of Clause 23, wherein sending the indication of the one or more frequency spacings arranged among the multiple carrier frequencies comprises sending the indication via at least one of RRC signaling, MAC signaling, DCI, SCI, or system information.

Clause 25: The method of any one of Clauses 16-24, wherein one or more frequency spacings arranged among the multiple carrier frequencies are defined based on a frequency band including the multiple carrier frequencies.

Clause 26: The method of any one of Clauses 16-25, further comprising: sending an indication of the multiple carrier frequencies associated with the signal.

Clause 27: One or more apparatuses, comprising: one or more memories comprising executable instructions; and one or more processors configured to execute the executable instructions and cause the one or more apparatuses to perform a method in accordance with any one of clauses 1-26.

Clause 28: One or more apparatuses, comprising means for performing a method in accordance with any one of clauses 1-26.

Clause 29: One or more non-transitory computer-readable media comprising executable instructions that, when executed by one or more processors of one or more apparatuses, cause the one or more apparatuses to perform a method in accordance with any one of clauses 1-26.

Clause 30: One or more computer program products embodied on one or more computer-readable storage media comprising code for performing a method in accordance with any one of clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:
    one or more memories;
    one or more processors coupled to the one or more memories, the one or more processors being configured to cause the apparatus to:
        receive a signal comprising multiple carrier frequencies modulated with on-off keying,
        decode the signal based at least in part on a delta frequency being associated with a first carrier frequency and a second carrier frequency among the multiple carrier frequencies, and
        recover data from the decoded signal:
    a first rectifier configured to rectify the signal and to output a first rectified signal;
    a first filter configured to filter the first rectified signal in one or more pass bands and to output a first filtered signal, wherein the delta frequency is in at least one of the one or more pass bands;
    a second rectifier configured to rectify the first filtered signal and to output a second rectified signal; and
    a second filter configured to filter the second rectified signal and to output the decoded signal that includes an amplitude modulation signal.

2. The apparatus of claim 1, wherein the delta frequency defines a difference between the first carrier frequency and the second carrier frequency.

3. The apparatus of claim 1, wherein:
    the first rectifier having an input and an output;
    the first filter having an input coupled to the output of first rectifier and having an output;
    the second rectifier having an input coupled to the output of first filter and having an output; and
    the second filter having an input coupled to the output of the second rectifier.

4. The apparatus of claim 1, wherein the second carrier frequency is adjacent to the first carrier frequency.

5. The apparatus of claim 1, wherein the multiple carrier frequencies include a third carrier frequency arranged between the first carrier frequency and the second carrier frequency.

6. The apparatus of claim 1, wherein to decode the signal, the one or more processors are configured to cause the apparatus to decode the signal based at least in part on a plurality of delta frequencies, including the delta frequency, associated with the multiple carrier frequencies.

7. The apparatus of claim 6, wherein:
    the one or more processors are configured to cause the apparatus to monitor for interference associated with the signal; and
    to decode the signal, the one or more processors are configured to cause the apparatus to decode the signal based at least in part on monitored interference.

8. The apparatus of claim 6, wherein the one or more processors are configured to cause the apparatus to receive an indication of at least one of the plurality of delta frequencies to use for decoding.

9. The apparatus of claim 1, wherein:
    the one or more processors are configured to cause the apparatus to send an indication of one or more delta frequencies that the apparatus is capable of using for decoding the signal, and
    the one or more delta frequencies includes the delta frequency.

10. The apparatus of claim 1, wherein the one or more processors are configured to cause the apparatus to receive an indication of one or more frequency spacings arranged among the multiple carrier frequencies.

11. The apparatus of claim 10, wherein to receive the indication of the one or more frequency spacings arranged among the multiple carrier frequencies, the one or more processors are configured to cause the apparatus to receive the indication via at least one of radio resource control (RRC) signaling, medium access control (MAC) signaling, downlink control information (DCI), sidelink control information (SCI), or system information.

12. The apparatus of claim 1, wherein one or more frequency spacings arranged among the multiple carrier frequencies are defined based on a frequency band including the multiple carrier frequencies.

13. The apparatus of claim 1, to decode the signal, the one or more processors are configured to cause the apparatus to decode the signal based at least in part on a blind detection of the delta frequency.

14. The apparatus of claim 1, wherein:
    the one or more processors are configured to cause the apparatus to receive an indication of the multiple carrier frequencies associated with the signal; and
    to decode the signal, the one or more processors are configured to cause the apparatus to decode the signal based on the indication of the multiple carrier frequencies.

15. An apparatus configured for wireless communications, comprising:
    one or more memories; and
    one or more processors coupled to the one or more memories, the one or more processors being configured to cause the apparatus to:
        obtain an indication of one or more delta frequencies for decoding a multi-carrier signal modulated with on-off keying, the one or more delta frequencies including a delta frequency,
        monitor for interference associated with the multi-carrier signal,
        select multiple carrier frequencies that form the one or more delta frequencies based on the monitored interference, and
        send a signal comprising multiple carrier frequencies modulated with the on-off keying, wherein the multiple carrier frequencies comprise a first carrier frequency and a second carrier frequency, wherein the delta frequency is associated with the first carrier frequency and the second carrier frequency, and wherein the signal comprises data.

16. A method of wireless communications by an apparatus, comprising:
receiving a signal comprising multiple carrier frequencies modulated with on-off keying;
decoding the signal based at least in part on a delta frequency being associated with a first carrier frequency and a second carrier frequency among the multiple carrier frequencies, wherein decoding the signal comprises:
rectifying the signal and outputting a first rectified signal via a first rectifier;
filtering the first rectified signal in one or more pass bands and outputting a first filtered signal via a first filter, wherein the delta frequency is in at least one of the one or more pass bands;
rectifying the first filtered signal and outputting a second rectified signal via a second rectifier; and
filtering the second rectified signal and outputting, via a second filter, the decoded signal that includes an amplitude modulation signal; and
recovering data from the decoded signal.

17. The method of claim 16, wherein the delta frequency defines a difference between the first carrier frequency and the second carrier frequency.

18. The method of claim 16, wherein:
rectifying the signal comprises the rectifying the signal via the first rectifier having an input and an output;
filtering the first rectified signal comprises filtering the first rectified signal via the first filter having an input coupled to the output of first rectifier and having an output;
rectifying the first filtered signal comprises rectifying the first filtered signal via the second rectifier having an input coupled to the output of first filter and having an output; and
filtering the second rectified signal comprises filtering the second rectified signal via the second filter having an input coupled to the output of the second rectifier.

19. The method of claim 16, wherein the second carrier frequency is adjacent to the first carrier frequency.

20. The method of claim 16, wherein the multiple carrier frequencies include a third carrier frequency arranged between the first carrier frequency and the second carrier frequency.

21. The method of claim 16, wherein decoding the signal comprises decoding the signal based at least in part on a plurality of delta frequencies, including the delta frequency, associated with the multiple carrier frequencies.

22. The method of claim 21, further comprising:
monitoring for interference associated with the signal,
wherein decoding the signal comprises decoding the signal based at least in part on the monitored interference.

23. The method of claim 21, further comprising receiving an indication of at least one of the plurality of delta frequencies to use for decoding.

24. The method of claim 16, further comprising:
sending an indication of one or more delta frequencies that the apparatus is capable of using for decoding the signal,
wherein the one or more delta frequencies includes the delta frequency.

25. The method of claim 16, further comprising receiving an indication of one or more frequency spacings arranged among the multiple carrier frequencies.

26. The method of claim 25, wherein receiving the indication of the one or more frequency spacings arranged among the multiple carrier frequencies comprises receiving the indication via at least one of radio resource control signaling, medium access control signaling, downlink control information, sidelink control information, or system information.

27. The method of claim 16, wherein one or more frequency spacings arranged among the multiple carrier frequencies are defined based on a frequency band including the multiple carrier frequencies.

28. The method of claim 16, wherein decoding the signal comprises decoding the signal based at least in part on a blind detection of the delta frequency.

29. The method of claim 16, further comprising:
receiving an indication of the multiple carrier frequencies associated with the signal,
wherein decoding the signal comprises decoding the signal based on the indication of the multiple carrier frequencies.

30. A method of wireless communications by an apparatus, comprising:
obtaining an indication of one or more delta frequencies for decoding a multi-carrier signal modulated with on-off keying, the one or more delta frequencies including a delta frequency;
monitoring for interference associated with the multi-carrier signal;
selecting multiple carrier frequencies that form the one or more delta frequencies based on the monitored interference; and
sending a signal comprising the multiple carrier frequencies modulated with the on-off keying, wherein the multiple carrier frequencies comprise a first carrier frequency and a second carrier frequency, wherein the delta frequency is associated with the first carrier frequency and the second carrier frequency, and wherein the signal comprises data.

* * * * *